(12) United States Patent
Yasutake

(10) Patent No.: US 8,009,138 B2
(45) Date of Patent: Aug. 30, 2011

(54) MULTIDIMENSIONAL INPUT DEVICE

(75) Inventor: Taizo Yasutake, Cupertino, CA (US)

(73) Assignee: Sandio Technology Corporation, San Jose, CA (US)

( * ) Notice: Subject to any disclaimer, the term of this patent is extended or adjusted under 35 U.S.C. 154(b) by 1495 days.

(21) Appl. No.: 11/323,574

(22) Filed: Dec. 29, 2005

(65) Prior Publication Data

US 2006/0250353 A1 Nov. 9, 2006

Related U.S. Application Data

(60) Provisional application No. 60/679,557, filed on May 9, 2005, provisional application No. 60/680,910, filed on May 13, 2005.

(51) Int. Cl.
*G09G 5/00* (2006.01)
(52) U.S. Cl. .......................... 345/156; 345/163
(58) Field of Classification Search ........... 345/156–172
See application file for complete search history.

(56) References Cited

U.S. PATENT DOCUMENTS

| | | | |
|---|---|---|---|
| 5,335,557 A | 8/1994 | Yasutake | |
| 5,453,758 A * | 9/1995 | Sato | 345/158 |
| 5,483,261 A | 1/1996 | Yasutake | |
| 5,657,051 A | 8/1997 | Liao | |
| 5,729,249 A | 3/1998 | Yasutake | |
| 5,805,137 A | 9/1998 | Yasutake | |
| 5,825,308 A * | 10/1998 | Rosenberg | 341/20 |
| 5,876,325 A | 3/1999 | Mizuno et al. | |
| 6,115,028 A * | 9/2000 | Balakrishnan et al. | 345/157 |
| 6,172,665 B1 | 1/2001 | Bullister | |
| 7,245,287 B2 * | 7/2007 | Hinckley et al. | 345/156 |
| 2004/0160414 A1 * | 8/2004 | Armstrong | 345/156 |

FOREIGN PATENT DOCUMENTS

JP 3421167 2/1996

OTHER PUBLICATIONS

PCT/US06/16388, International Search Report, Sep. 18, 2006.

* cited by examiner

*Primary Examiner* — Kevin M Nguyen
*Assistant Examiner* — Kenneth B Lee, Jr.
(74) *Attorney, Agent, or Firm* — Chun-Ming Shih

(57) ABSTRACT

A multidimensional input device is disclosed. In one embodiment, the multidimensional mouse comprises three sensors and a chassis. Each sensor is suitable for finger operation and capable of generating two control signals which represent motion in two degrees of freedom. The three sensors are coupled to the chassis which is suitable for a user to grasp with one hand. Thus, a user can generate six control input signals representing motion in six degrees of freedom with one hand.

45 Claims, 39 Drawing Sheets

$X_1Y_1$ $X_2Y_2$

4 WAY DIGITAL 1  4 WAY DIGITAL 2

MULTIDIMENSIONAL INPUT DEVICE

CROSS-REFERENCE TO RELATED APPLICATIONS

This application claims the benefit of U.S. Ser. No. 60/679,557, filed on May 9, 2005, and U.S. Ser. No. 60/680,910, filed on May 13, 2005, both of which are incorporated herein by reference.

BACKGROUND

Three dimensional ("3D") input devices are used in high end 3D computer-aided design ("CAD") and 3D rendering software markets. Such 3D input devices, such as a keyboard, do not provide "mouse grade," high precision two dimensional ("2D") cursor movement, and therefore typically require supplemental input peripherals. A user typically will use his right hand to operate the 2D mouse and will utilize a 3D input device on the left side of keyboard using his left hand. As a result, a user is required to use both hands to do 3D graphic work.

In the past, several attempts have been made to facilitate manipulation of 3D applications. U.S. Pat. No. 4,811,608 discloses a six degrees of freedom joystick. However, the joystick requires a standard mouse for conventional 2D cursor control. U.S. Pat. No. 6,115,028 discloses a input device with 2D mouse function and four degrees of freedom input control. However, the input device is not well accepted by end users due to ergonomic issues. U.S. Pat. No. 6,844,871 discloses a charge coupled device ("CCD") that provides six degrees of freedom input control. However, the device has operational ergonomic difficulties.

Another approach to add functionality to the standard mouse is to incorporate a trackball into the mouse body (see U.S. Pat. Nos. 5,298,919, 6,184,869 and 5,959,614). However, this type of mouse cannot provide coarse or fast velocity 3D command control typically required for fly-through movement in virtual 3D environments.

Other commonly used input devices include game pads and joysticks. However, game pads and joysticks typically utilize a game specific design and do not provide mouse cursor functions. As a result, game pad and joysticks are not suitable for conventional business software.

Requirements for a 3D input device vary significantly and depend on a 3D application's contents. For example, 3D CAD users typically require high precision 3D command control meaning the control speed for 3D manipulation is slower (except for a "quickview" action on 3D objects). On the other hand, 3D business software, such as a virtual model house or a virtual 3D geological map, typically require fly-through or walk-through based 3D commands. For these kinds of applications, fast velocity commands in six degrees of freedom are required to quickly move in the virtual 3D environment. In case of 3D PC games, fast commands in six degrees of freedom can be required for walk-through situations, as well as high precision/slow 3D controls such as yaw or pitch, for target shooting.

What is needed is a multidimensional device that facilitates manipulation of 3D applications in a convenient and efficient manner. Further, what is needed is a device that provides conventional 2D input commands as well as commands in six degrees of freedom. Moreover, what is needed is a system that conveniently and efficient interfaces with a multidimensional device.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one embodiment, a multidimensional input device can comprise a first sensor, a second sensor, a third sensor, and a chassis. The first, second and third sensors can be suitable for finger operation. The first sensor can be capable of generating a first input control signal and a second input control signal. The first input control signal can represent motion in a first degree of freedom while the second input control signal can represent motion is a second degree of freedom. The second sensor can be capable of generating a third input control signal and a fourth input control signal. The third input control signal can represent motion in a third degree of freedom while the fourth input control signal can represent motion in a fourth degree of freedom. The third sensor can be capable of generating a fifth input control signal and a sixth input control signal. The fifth input control signal can represent motion in a fifth degree of freedom while the sixth input control signal can represent motion in a sixth degree of freedom. The three sensors can be coupled to the chassis which is suitable for a user to grasp with one hand. Thus, the user can generate six control input signals representing motion in six degrees of freedom with one hand.

In certain alternate embodiments, the chassis can have a bottom surface suitable for sliding on a flat surface. A sensor can be located on the bottom surface of the chassis. The sensor located on the bottom of the chassis can generate a seventh input control signal and an eighth input control signal. The seventh input control signal can represent a seventh degree of freedom while the eighth input control signal can represent an eighth degree of freedom. In further embodiments, the chassis can have a wheel pivotally coupled to a top surface of the chassis. The wheel can be suitable for finger operation and capable of generating a ninth input control signal. The ninth input control signal can represent a ninth degree of freedom.

In certain embodiments, the first, second, third, fourth, fifth, and sixth degrees of freedom can represent fast/coarse three dimensional manipulation while the seventh, eight, and ninth degrees of freedom can represent conventional two dimensional operation. In alternate embodiments, the chassis can be a mouse body and can comprise two mouse buttons thereby facilitating manipulation of both 3D applications and conventional 2D applications with one device.

Moreover, in another embodiment, the first, second, and third sensors can follow an intuitive three dimensional command mapping rule. For example, to make an object spin along an axis in a left to right pattern, the user can touch a back portion of a sensor on the left side of the chassis and touch a forward portion of a sensor on the opposite side.

In further embodiments, the degrees of freedom can be represented by movement in an X-Y-Z plane. Movement along an axis can be translation while movement around an axis can be rotation. In one embodiment, the first degree of freedom can be represented by movement along an X-axis. The second degree of freedom can be represented by angular movement around the X-axis. The third degree of freedom can be represented by movement along a Y-axis. The fourth degree of freedom can be represented by movement along a Z-axis. The fifth degree of freedom can be represented by angular movement around the Y-axis, while the sixth degree of freedom can be represented by angular movement around the Z-axis.

In certain alternate embodiments, the seventh degree of freedom and the eighth degree of freedom can be represented by movement in a two dimensional X-Y plane. Further, the ninth degree of freedom can be represented by movement along a Z-axis. Moreover, in additional embodiments, the user can create a configuration specifying the representation of the degrees of freedom. In other embodiments, the degrees of freedom can vary depending on a variety of hardware and/or software factors.

Additional alternate embodiments vary the location of the sensors on the chassis. For example, in one embodiment, the first sensor and the second sensor can be located on opposite sides of the chassis while the third sensor can be located on top of the chassis. In another embodiment, all of the sensors can be located on top of the chassis. In alternate embodiments, two of the sensors can be located on the same side of the chassis while the third sensor can be located on top of the chassis. The sensors can also surround each other or be located in a hole in the chassis.

In further embodiments, the sensors can vary. For example, the sensors can be analog, digital, touchpad, or tilt wheel. Moreover, two or more sensors can be combined to form a combination sensor. In other embodiments, the chassis can be integrated into a keyboard, a laptop computer, or a joystick. In another embodiment, the chassis can be a mouse body.

Another embodiment includes a joystick. The joystick can comprise a trackball, a joystick stem, and a base. The trackball can be capable of generating a seventh input control signal and an eighth input control which can represent motion in a seventh degree of freedom and an eighth degree of freedom. The joystick stem can have a top and a bottom and be capable of generating a ninth input control signal and a tenth input control signal. The ninth input control signal can represent motion in a ninth degree of freedom and the tenth control signal can represent motion in a tenth degree of freedom. The trackball and the bottom of the joystick stem can be coupled to a top of the base. The chassis can be coupled to the top of the joystick stem. In additional embodiments, the joystick can facilitate three dimensional manipulation of a robot. Further, the joystick can include a camera or a gripper coupled to the joystick stem.

In another embodiment, the multidimensional device can further include a handheld controller. The handheld controller can comprise a trackball, a right mouse button, a left mouse button, a wheel, a plurality of programmable digital buttons, and an LCD screen for displaying a device status. The chassis can be coupled to the handheld controller.

In further embodiments, the multidimensional device can further comprise a USB connector for providing the input control signals to a computer. In additional embodiments, the device can comprise user programmable buttons and an LCD screen.

An alternate embodiment is an interfacing system. The interfacing system can comprise a multidimensional device and a firmware program. The multidimensional device can have a plurality of sensors including a first group and a second group. The first group of sensors can be capable of generating a first group of input control signals and the second group of signals can be capable of generating a second group of input control signals. The firmware program can be embedded into the multidimensional device and be capable of generating an output. The output can simulate a first logical device and a second logical device. The first logical device can represent the first group of input control signals while the second logical device can represent the second group of input control signals. A computer receiving the output from the multidimensional device can operate as though two independent logical devices exist.

In additional embodiments, the first logical device of the interfacing system can be used to manipulate two dimensional applications and the second logical device can be used to manipulate three dimensional applications. Moreover, in alternate embodiments, the firmware program can further comprises a two dimensional input control signal slave module and a three dimensional input control signal slave module. In an alternate embodiment, a User Level Interface Software Module on a host PC can optionally allow users to use the second logical device for manipulation of 3D application programs in both Windows XP and Windows Vista. In other embodiments, the multidimensional device can include a USB connector for detachably coupling to a USB port on the computer.

In further embodiments, the multidimensional device can further comprise a third group of sensors. The third group of sensors can generate a third group of input control signals. A third logical device can represent the third group of input control signals. The third logical device can be represented by the output thereby allowing the computer to detect three independent logical devices.

Another embodiment is a method for multidimensional control. The method comprises providing a first sensor, a second sensor, a third sensor and a chassis. The first sensor can be suitable for finger operation and capable of generating a first and a second input control signal. The first input control signal can represent motion in a first degree of freedom while the second input control signal can represent motion in a second degree of freedom. The second sensor can be suitable for finger operation and capable of generating a third and a fourth input control signal. The third input control signal can represent motion in a third degree of freedom while the fourth input control signal can represent motion in a fourth degree of freedom. The third sensor can be suitable for finger operation and capable of generating a fifth and sixth input control signal. The fifth input control signal can represent a fifth degree of freedom while the sixth input control signal can represent a sixth degree of freedom. The chassis can be suitable for a user to grasp with one hand and be coupled to the first, second, and third sensors. The first, second, and third sensor are then coupled to the chassis in a position that allows a user to generate six input control signals representing motion in six degrees of freedom with one hand.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The present invention teaches a variety of devices, methods, and other subject matter described herein or apparent to one skilled in the art in light of the present teaching. The present invention further teaches a variety of embodiments, aspects and the like, all distinctive in their own right. The person of skill in the art suitable for the present invention can have a background from computer science, computer engineering, electrical engineering, mechanical engineering, or the like.

As discussed above, a multidimensional input device is disclosed. In one embodiment, the device comprises three sensors, each of the sensors providing input control signals representing motion in two degrees of freedom. In further embodiments, a chassis, to which the sensors are coupled, further includes another sensor and a wheel providing input control signals for another three degrees of freedom. The chassis can be shaped as a mouse and provide either conventional 2D or precise 3D functions as well as fast and/or coarse 3D functions. Further, a system for interfacing with the multidimensional device is disclosed in which two logical devices from an output are detected by a computer.

Multidimensional Mouse

Figure 1:
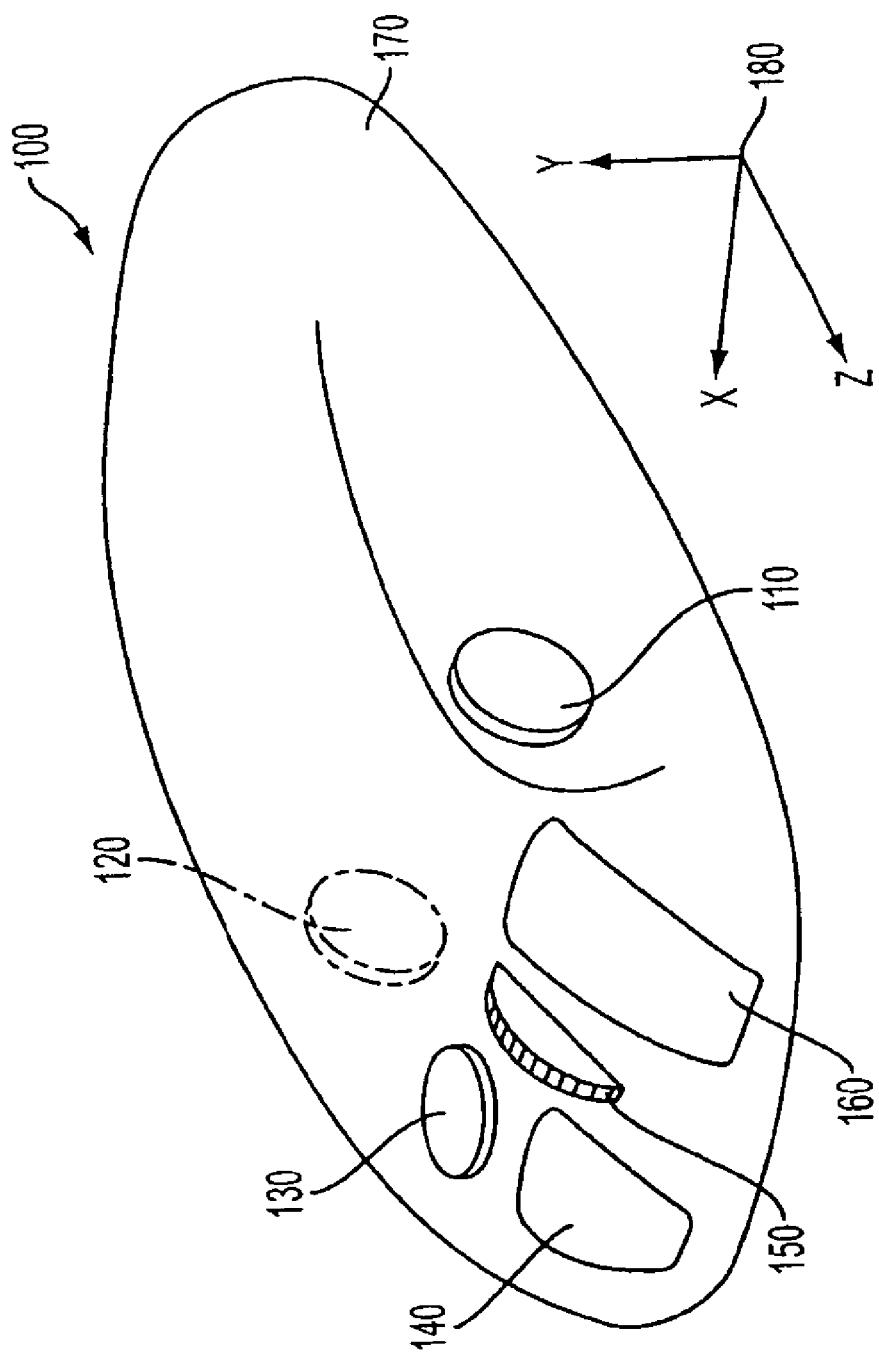
FIGS. 1-3 illustrate a multidimensional mouse that provides conventional three degrees of freedom (x,y mouse movement and wheel rotation) with independent six degrees of freedom command features, in accordance with an exemplary embodiment.
Figure 3:
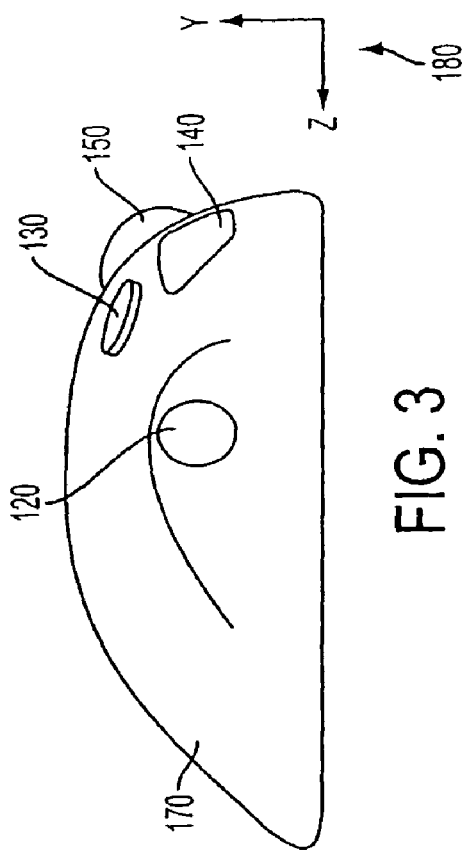
Figure 2:
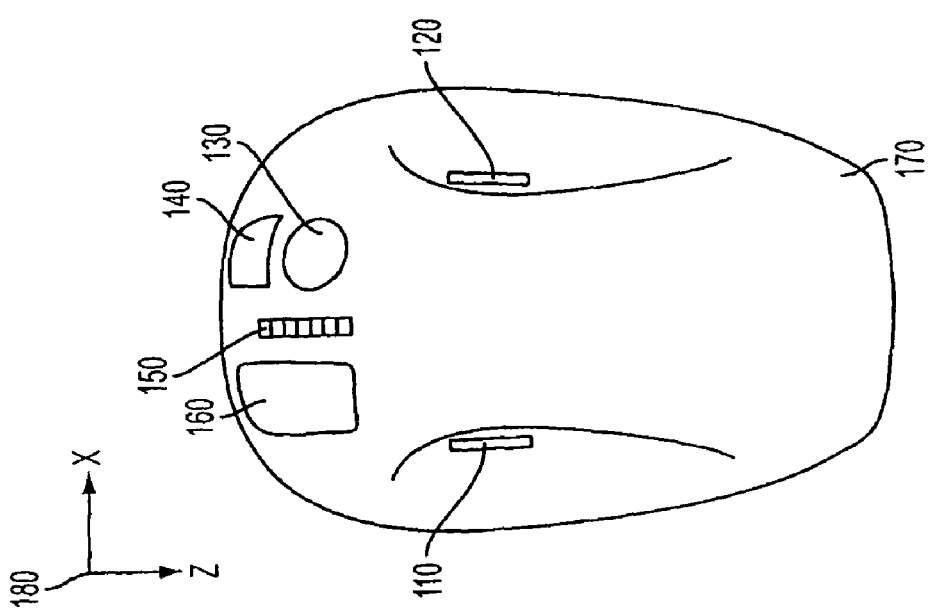

FIGS. 1-3 illustrate a multidimensional device 100. FIG. 1 depicts a top left view of the multidimensional device, FIG. 2 depicts an overhead view of the multidimensional device while FIG. 3 depicts a side right view of the multidimensional device. As illustrated, the multidimensional mouse 100 includes a third sensor 110, a second sensor 120, a first sensor 130, a left mouse button 160, a right mouse button 140, a wheel 150, and a chassis 170 in the form of a mouse body. The multidimensional mouse 100 in the embodiments shown in FIGS. 1-3 can provide both conventional three degrees of freedom and an additional six degrees of freedom. The conventional three degrees of freedom are mouse movement in an X-Y plane (not shown) from a sensor (not shown) on the bottom of the mouse body 170 and conventional wheel rotation 150. In addition, the multidimensional mouse 100 provides six degrees of freedom independent from the X-Y plane (not shown) for mouse movement. As illustrated, the first sensor is aligned on an X-Z plane in the reference coordinates 180 shown in FIGS. 1-3. The second 120 and third 110 sensors are aligned on Y-Z coordinates in the reference coordinates 180.

In operation, the bottom sensor (not shown) is capable of generating two input control signals representing motion in two degrees of freedom, namely conventional mouse movement. In addition, the wheel is capable of generating an input control signal representing motion in another degree of freedom, namely conventional wheel movement. The third sensor 110, second sensor 120, and first sensor 130 are each capable of generating two input control signals which represent motion in two degrees of freedom, namely movement in the X-Y-Z plane 180. Further, each sensor can provide X and Y positional data on local coordinates. By developing interface software for a host PC, local X/Y position data of the sensors can be converted to 3D command data to be used in conjunction with a 3D graphics application program on a host PC.

Independent six degrees of freedom features do not necessarily provide "change of position" control command (zero order control commands). However, velocity commands, which are typically first order commands, are suitable for fast 3D commands for movement and/or rotation. Therefore, a user can use the multidimensional mouse shown in FIGS. 1-3 to generate precise (fine) commands for 3D manipulation by utilizing mouse movement and/or wheel rotation with a mouse button such as that used for CAD design work. Also, a user can use the three sensors for independent six degrees of freedom commands to generate fast (coarse) 3D commands such as fly-through in a 3D graphics environments.

Those of skill in the art in the computer graphics field will recognize and appreciate that a change of position control is typically referred to as a "zero order control" and the rate control or velocity control is typically referred to as a "first order control." By position control it is meant that the device displacement is mapped via cursor position. In the mouse case, relative change of displacement of mouse body (delta M) can be to move relative movement of the cursor (delta L). That is why this type of control is called zero order control. When force or displacement is mapped into the moving velocity of a cursor, this type of control is called rate control or first order control.

Generation of Six Degrees of Freedom Commands

FIGS. 4-7 illustrate a multidimensional device 200 with an exemplary representation of the six degrees freedom. In the embodiments illustrated, the multidimensional device 200 includes a third sensor 210, a second sensor 220, a first sensor 230, and a chassis 240. The sensors 210, 220, and 230 are coupled to the chassis 240 which is suitable for a user to grasp with one hand. By developing interface software, X/Y local position data of the sensors can be mapped into 3D commands for 3D graphics application software for use on a host PC. An exemplary representation of the six degrees of freedom can be intuitive mapping. Intuitive mapping involves mapping the sensor signals for the six degrees of freedom into a 3D command so that the direction of a user's finger movement/rotation is the same as the direction of movement/rotation of the graphically controlled object. However, in alternate embodiments, a user can re-arrange the 3D command mapping into their preferred mapping as determined by an interface software on a host PC.

Figure 4:
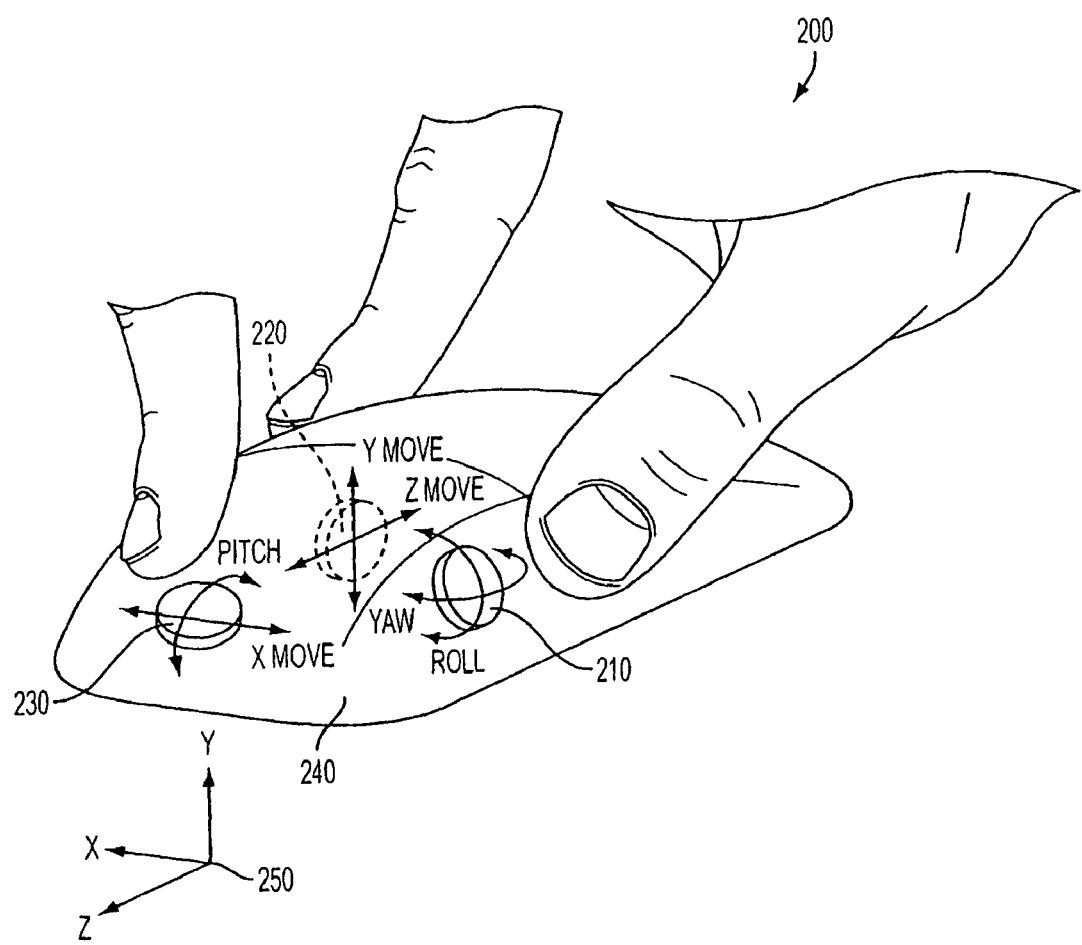
FIG. 4 illustrates how 3D commands can be mapped, in accordance with an exemplary embodiment.
Figure 5:
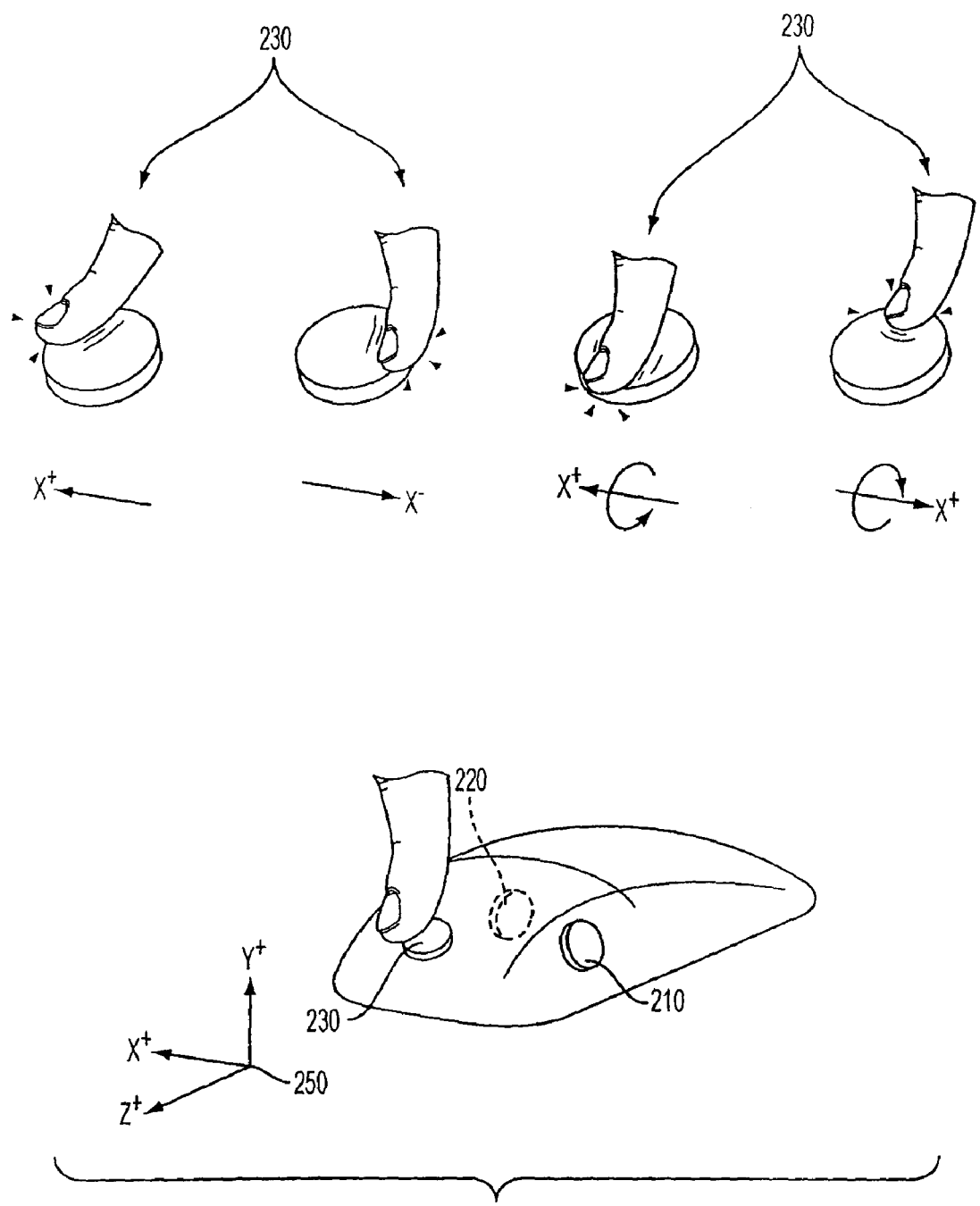
FIGS. 5-7 illustrate how sensor data is mapped to intuitive 3D commands, in accordance with an exemplary embodiment.
Figure 6:
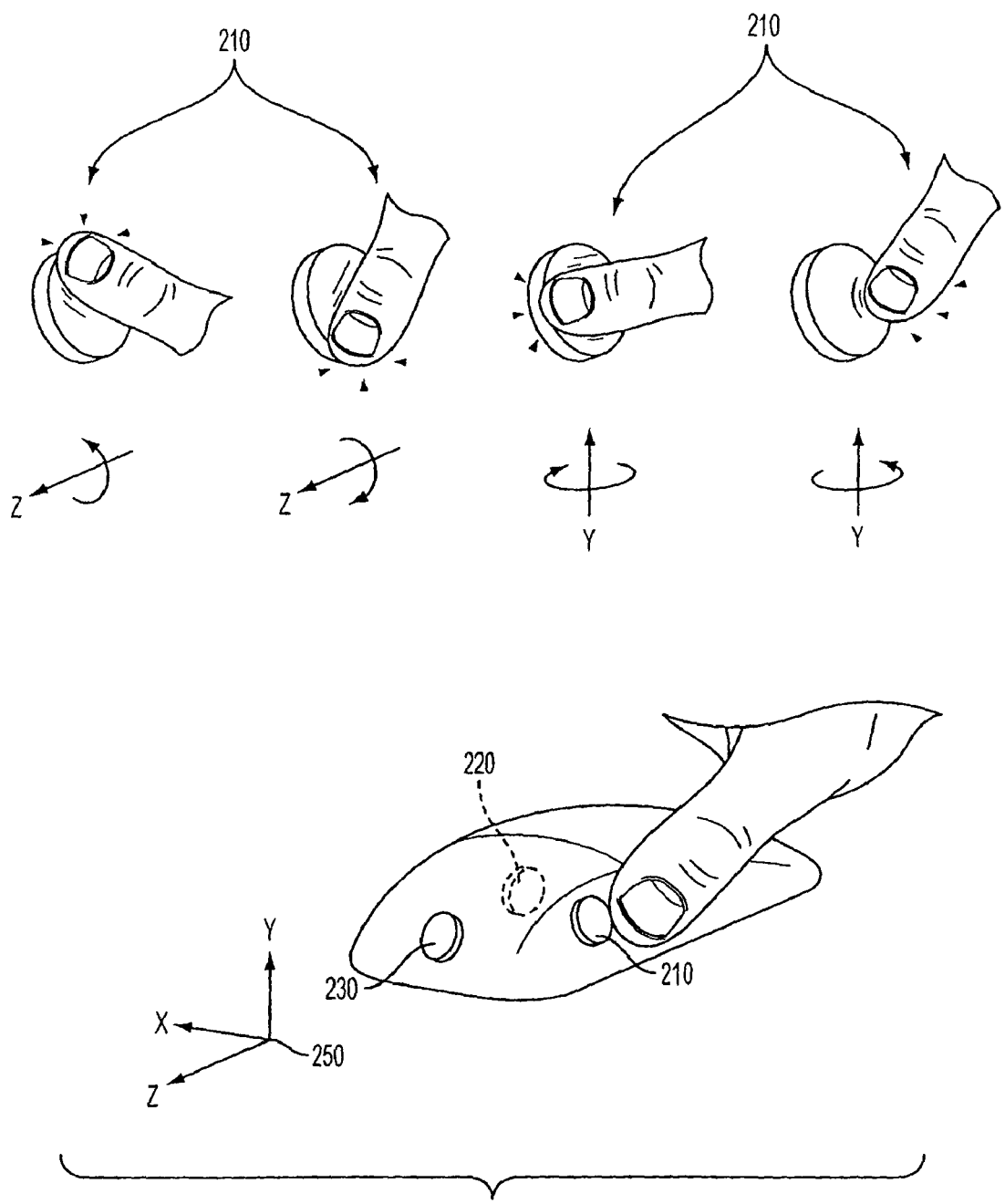
Figure 7:
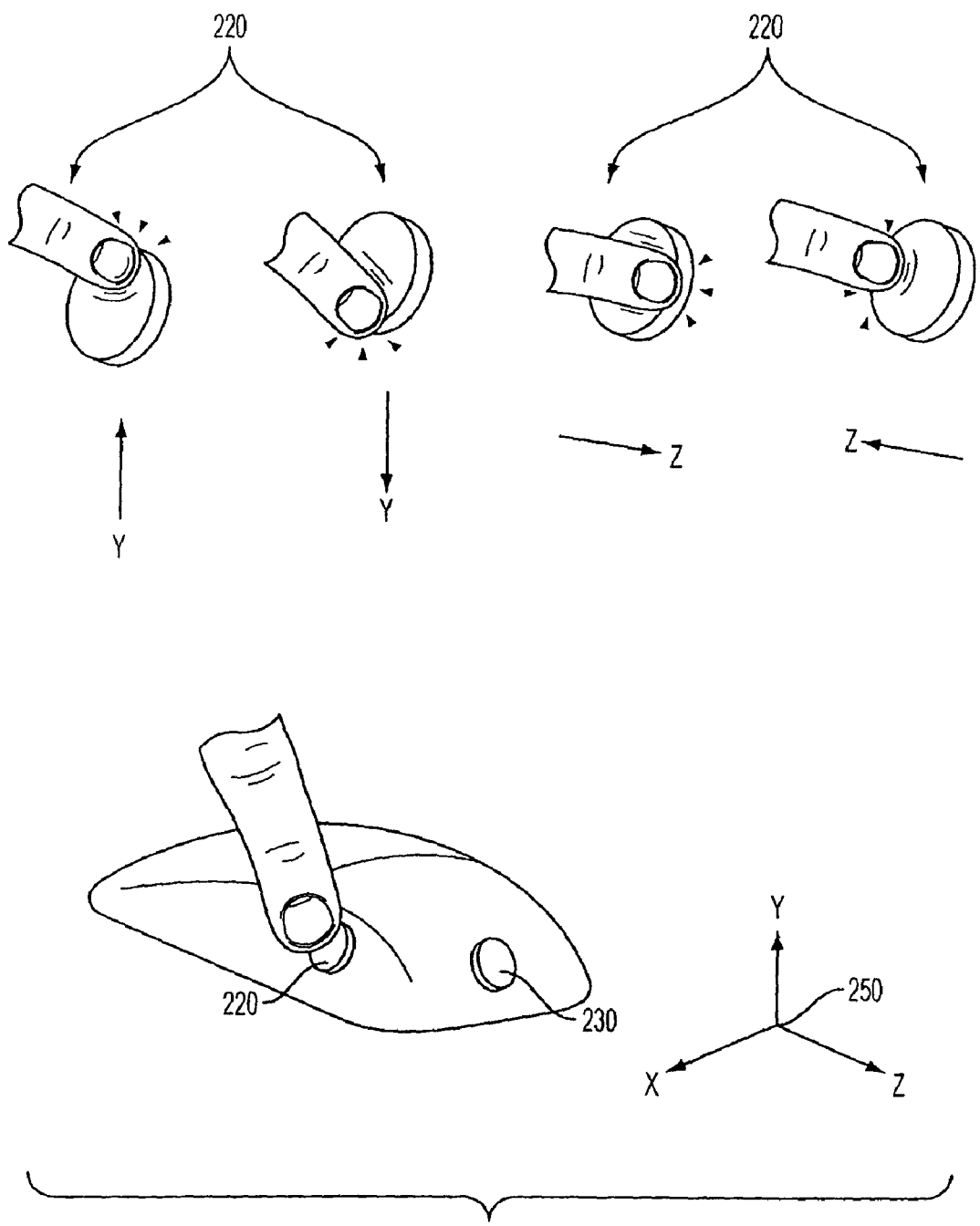

FIGS. 5-7 illustrate how sensor data is mapped to intuitive 3D commands, in accordance with an exemplary embodiment. In FIG. 4 and FIG. 5, when a user touches a right point of the first sensor (X+ direction) 230, the input control signal generated by this point can be used for an X+ translation command for 3D graphic environments. When the user touches a left point of the first sensor (X− direction) 230, the input control signal generated by this point can be used for an X− translation command for 3D graphic environments. When the user touches a forward point of the first sensor (Z+ direction) 230, the input control signal generated by this point can be used for a positive pitch (rotation about the X axis) command for 3D graphic environments. When the user touches a backward point of the first sensor (Z− direction) 230, the input control signal generated by this point can be used for a negative pitch (rotation about the X axis) command for 3D graphic environments.

In FIG. 4 and FIG. 6, when the user touches an upper point of the third sensor (Y+ direction) 210, the input control signal generated by this point can be used for positive roll (rotation about the Z axis) command for 3D graphic environments. When the user touches the lower point of the third sensor (Y− direction) 210, the input control signal generated by this point can be used for a negative roll command for 3D graphic environments. When the user touches a forward point of third sensor (Z+ direction) 210, the input control signal generated by this point can be used for a positive yaw (rotation about Y axis) command for 3D graphic environments. When the user touches a backward point of the third sensor (Z− direction) 210, the input control signal generated by this point can be used for a negative yaw (rotation about Y axis) command for 3D graphic environments.

In FIG. 4 and FIG. 7, when the user touches an upper point of the second sensor (Y+ direction) 220, the input control signal generated by this point can be used for a positive Y translation command for 3D graphic environments. When the user touches a lower point of the second sensor (Y− direction) 220, the input control signal generated by this point can be used for a negative Y translation command for 3D graphic environments. When the user touches a forward point of the second sensor (Z+direction) 220, the input control signal generated by this point can be used for a positive Z translation command for 3D graphic environments. When the user touches a backward point of the second sensor (Z− direction) 220, the signal generated by this point can be used for a negative Z translation command for 3D graphic environments.

FIGS. 8-11 illustrate a multidimensional device 300 with another exemplary representation of the six degrees freedom. In the embodiments illustrated, the multidimensional device 300 includes a third sensor 310, a second sensor 320, a first sensor 330, and a chassis 340. The sensors 310, 320, and 330 are coupled to the chassis 340 which is suitable for a user to grasp with one hand. In the embodiments illustrated in FIGS. 8-11, 3D command mappings for Y/Z translation and yaw/roll commands using two finger gestures such as a push and a twist are shown.

Figure 8:
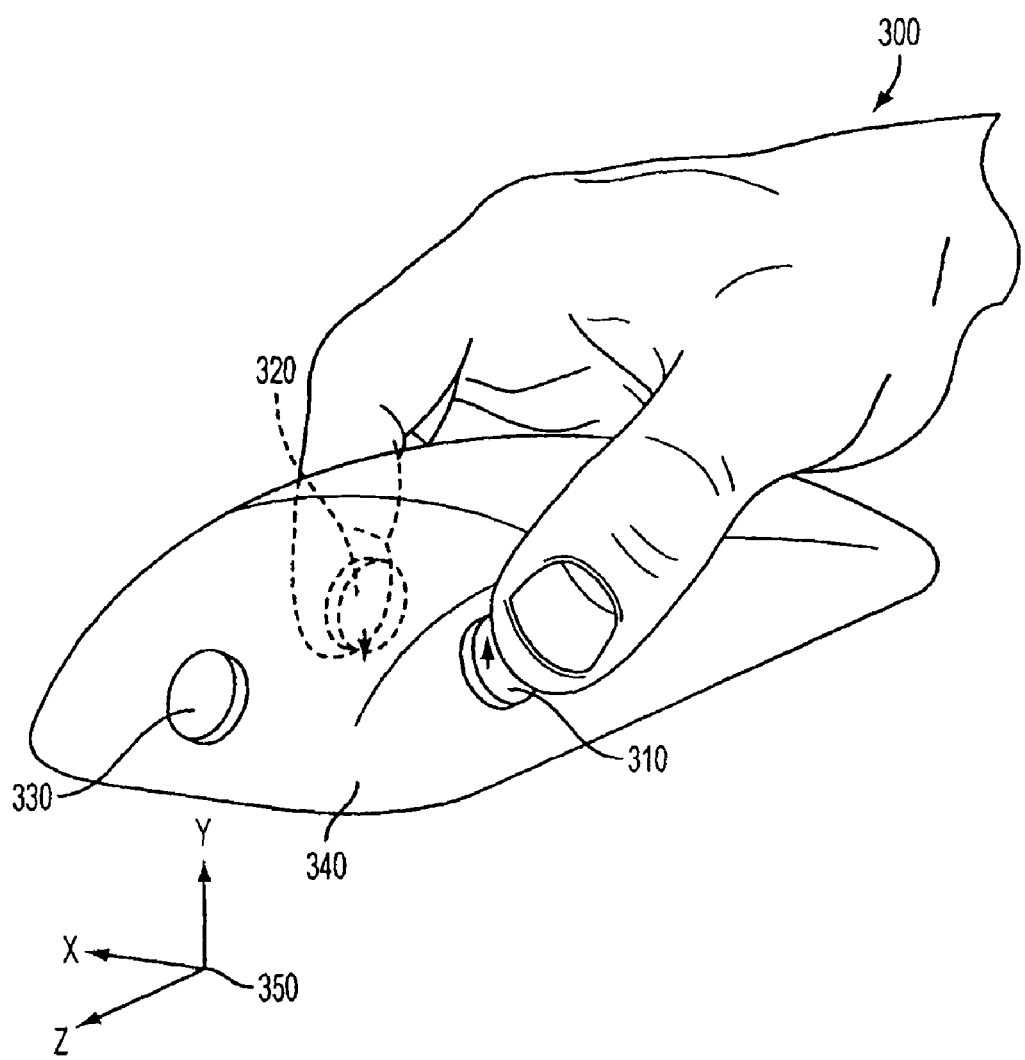
FIGS. 8-11 illustrate alternate 3D command mappings, of the mouse in FIG. 1, for Y/Z translation and yaw/roll commands using two finger gestures such as a push and a twist, in accordance with an exemplary embodiment.

In FIG. 8, a user touches a lower portion of the second sensor 320 and an upper portion of the third sensor 310, similar to twisting an object clockwise about the Z axis. The pair of these touch points can be used for generation of a positive roll command. This command mapping is very intuitive as the direction of the twisting gesture is the same direction of rotation as the object in 3D environments.

Figure 9:
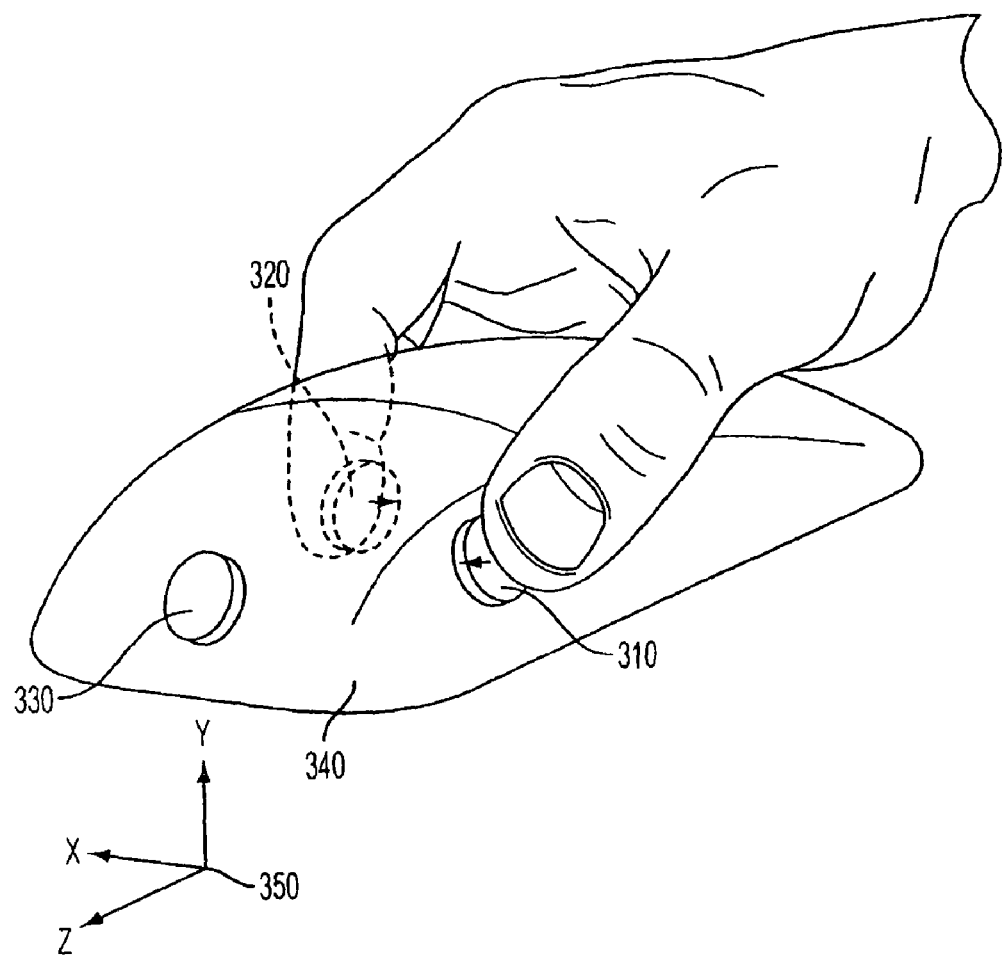

In FIG. 9, the user touches a backward portion of the second sensor 320 and a forward portion of the third sensor 310, similar to twisting an object clockwise about the Y axis. The pair of these touch points can be used for generation of positive yaw commands.

Figure 10A:
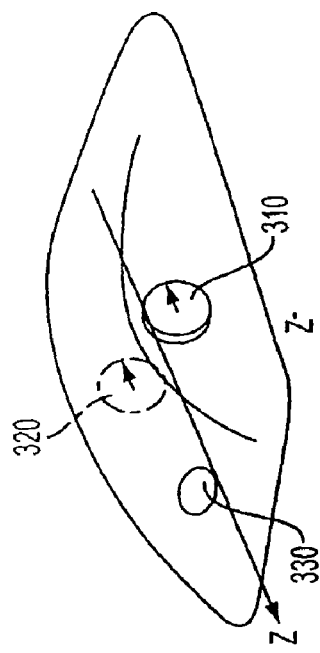
Figure 10B:
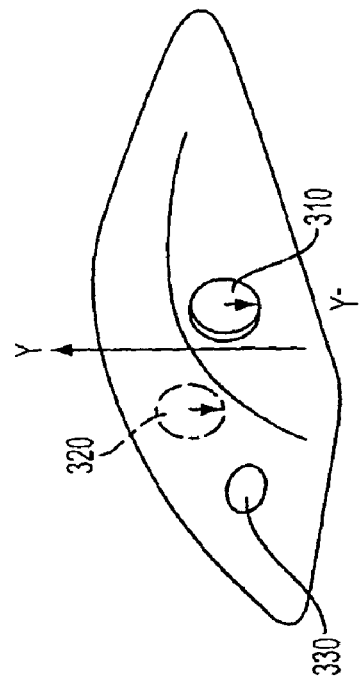
Figure 10C:
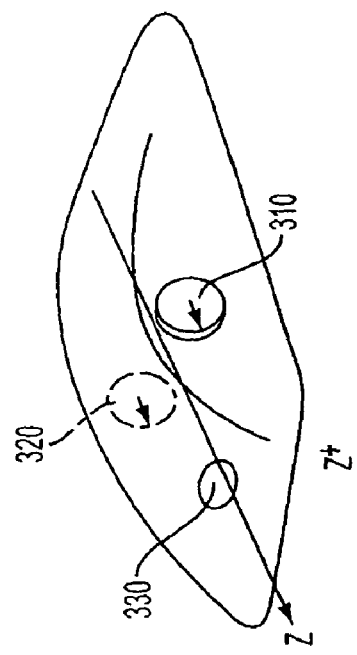
Figure 10D:
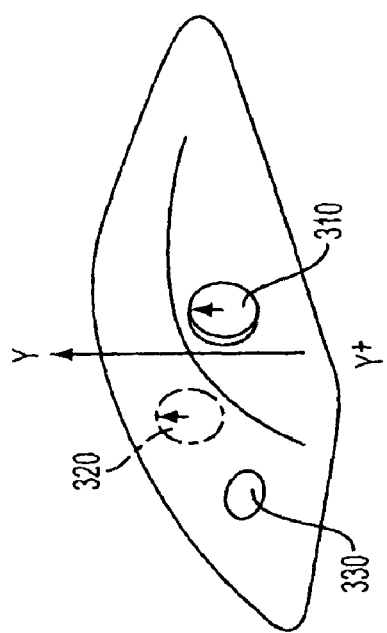

In FIG. 10B, the user touches a backward portion of both the second sensor 320 and third sensor 330 or, as shown in FIG. 10A, the forward portions of both the second sensor 320 and third sensor 330, similar to pulling or pushing an object about the Z axis. The pair of these touch points can be used for generation of Z translation commands. In embodiment shown in FIG. 10C, the user touches upper portions of both the second sensor 320 and third sensor 330 or, as shown in FIG. 10D, the lower portions of both the second sensor 320 and third sensor 330, similar to pulling or pushing an object about the Y axis. The pair of these touch points can be used for generation of Y translation commands.

Figure 11A:
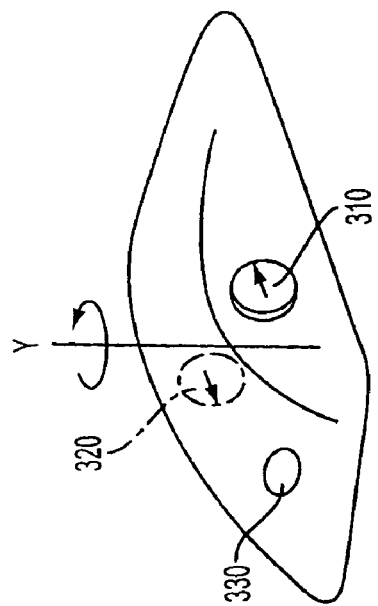
Figure 11B:
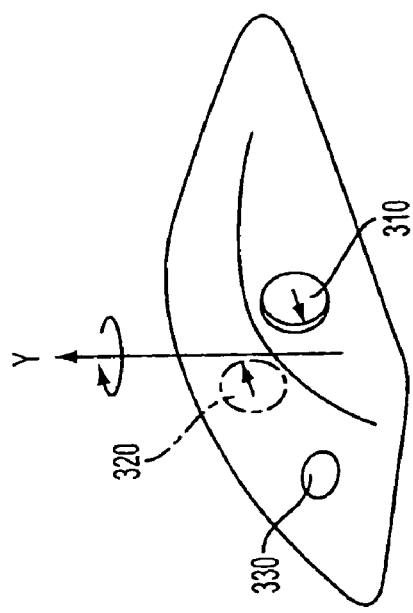
Figure 11C:
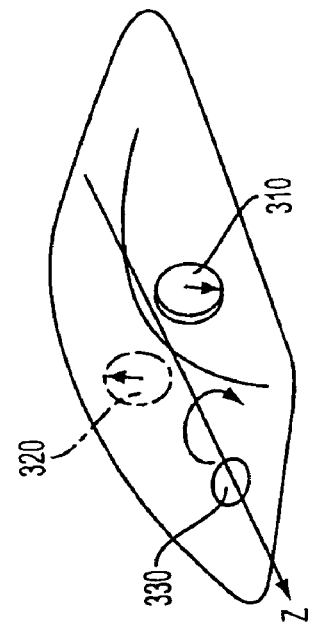
Figure 11D:
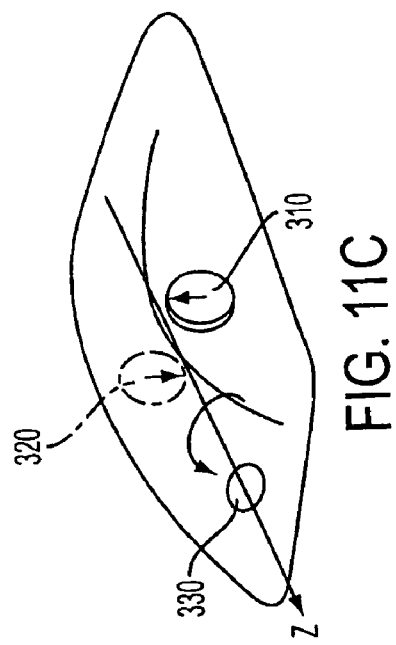

In FIG. 11A, the user touches a backward portion of the second sensor 320 and a forward portion of the third sensor or, as shown in FIG. 11B, a forward portion of the second sensor 320 and a backward portion of the third sensor 310 to generate a positive or negative rotation around the Y-axis. In the embodiment shown in FIG. 11D, the user touches an upper portion of the second sensor 320 and a lower portion of the third sensor 310 or, as shown in FIG. 11C, a lower portion of the second sensor 320 and an upper portion of the third sensor 310 to generate a positive or negative rotation around the Z axis.

Mouse Shape and Sensor Alignments

Figure 12:
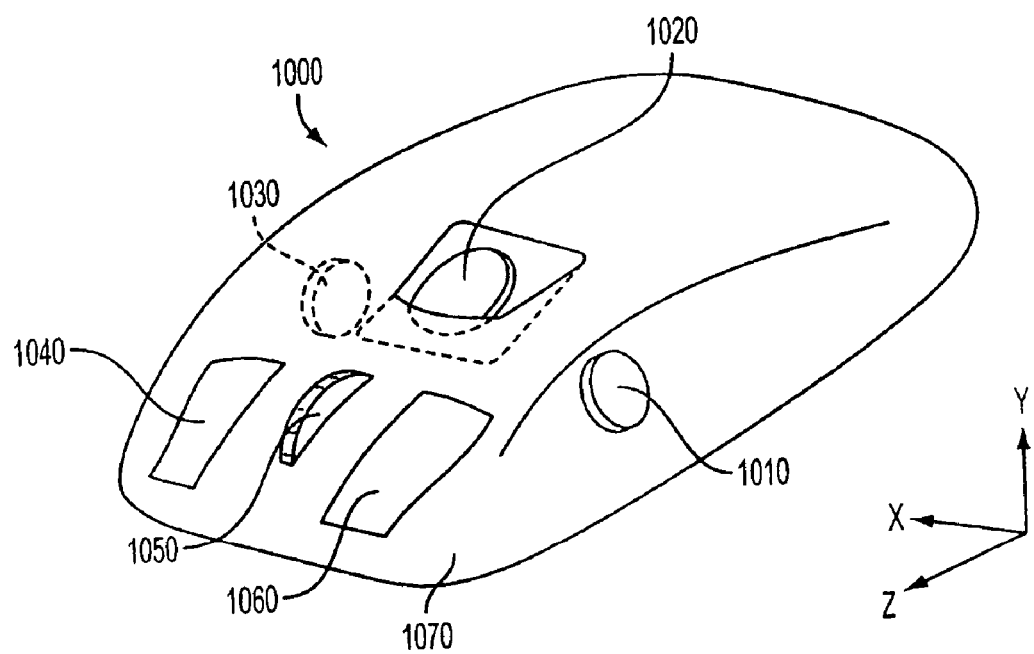
FIGS. 12-19 depict various alternative sensor positions and configurations on a mouse body, in accordance with an exemplary embodiment.
Figure 14:
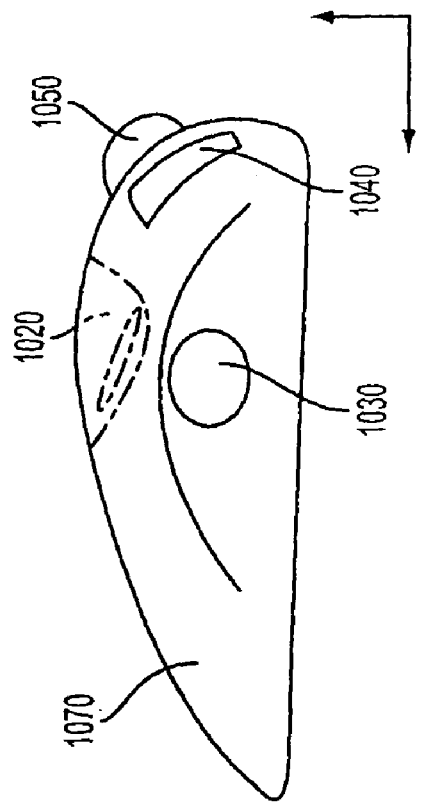
Figure 13:
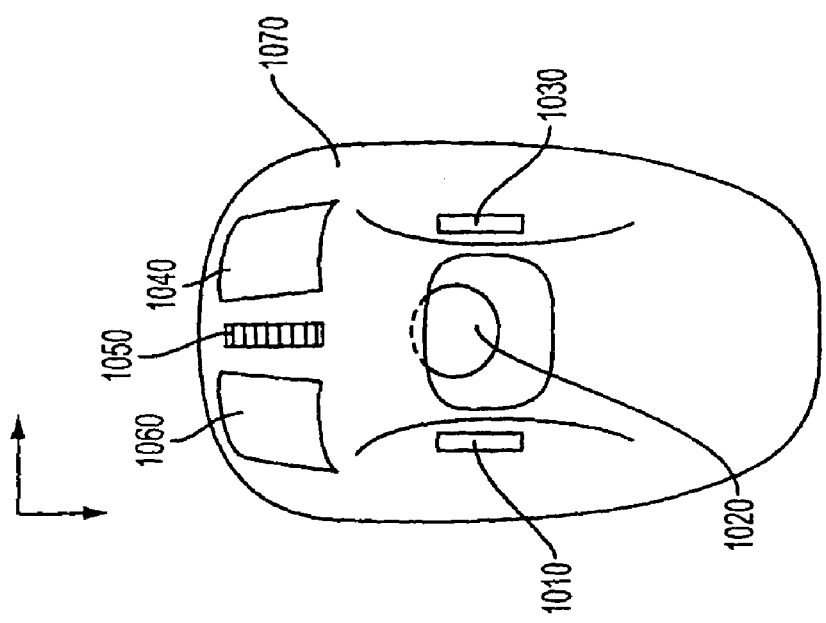

Mouse shape and sensor alignment can be modified based on the design concept of the multidimensional device 1000 illustrated in FIG. 12 by way of other exemplary and non-limiting examples. FIGS. 12-19 depict various alternative sensor positions and configurations, in accordance with exemplary embodiments. In the embodiments illustrated in FIGS. 12-14, a chassis 1070, which is formed as a mouse body, includes a third sensor 1010, a second sensor 1030, a first sensor 1020, a left mouse button 1060, a right mouse button 1040, and a wheel 1050. The first sensor 1020 is installed in a hollow of the mouse top surface. FIG. 12 illustrates a top left view of the mouse while FIG. 13 illustrates an overhead view and FIG. 14 illustrates a side view. Using interface software, a user can affect the same 3D command mapping that is shown in FIGS. 5-11.

Figure 15:
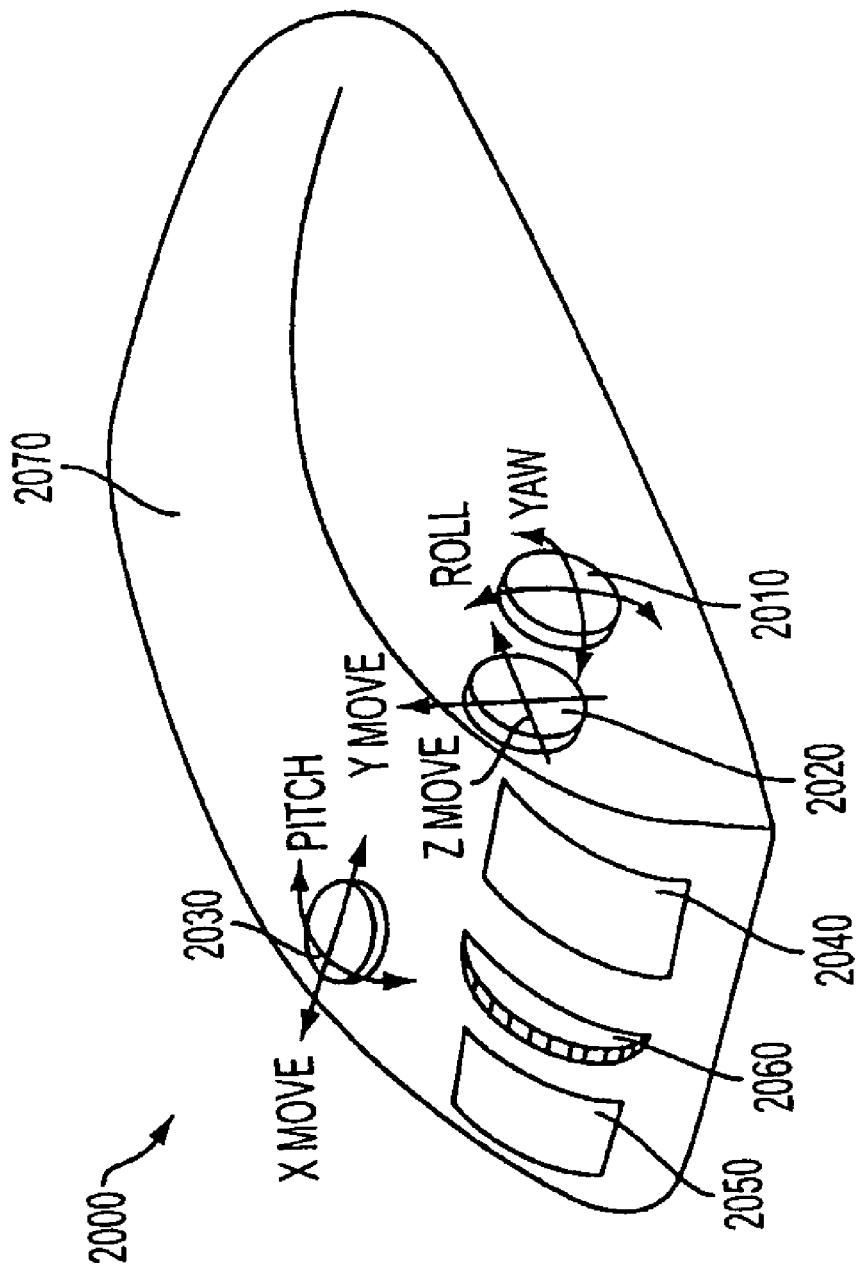

FIG. 15 illustrates a device 2000 having two sensors installed on a left side. In the embodiment illustrated, a chassis 2070, which is formed as a mouse body, includes a third sensor 2010 on the left of the chassis 2070, a second sensor 2020 on the left of the chassis 2070, a first sensor 2030, a left mouse button 2040, a right mouse button 2050, and a wheel 2060. The second sensor 2020 can be used for Y/Z translation commands and the first left sensor 2010 can be used for yaw/roll commands generation. The first sensor 2030 can be used for command generation of X translation and also for a pitch command.

Figure 16:
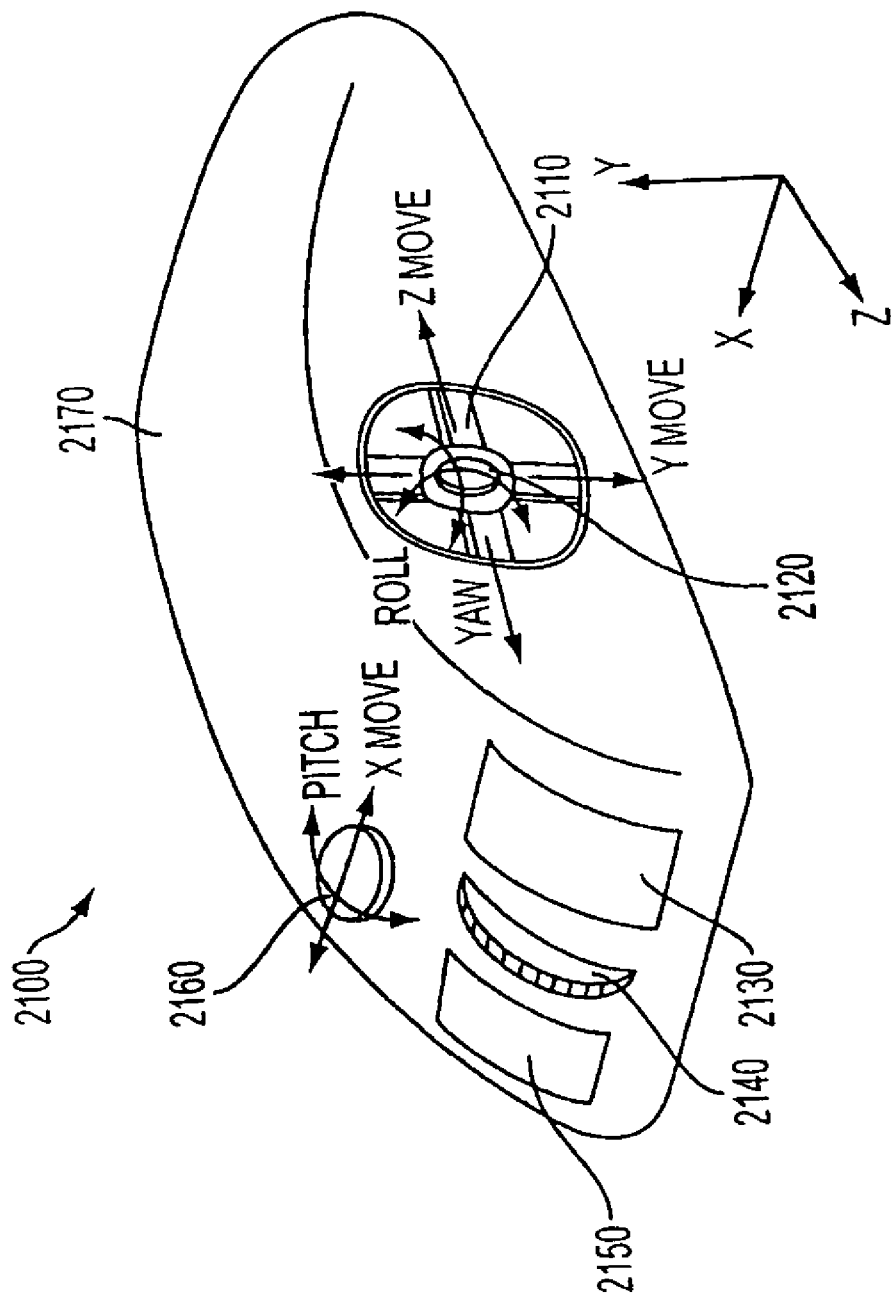

FIG. 16 illustrates a device 2100 having a combination sensor. In the embodiment illustrated, a chassis 2170, which is formed as a mouse body, includes a second sensor 2110 located on the left of the chassis 2170, a third sensor 2120 located on the left of the chassis 2170, a first sensor 2160, a left mouse button 2130, a right mouse button 2150, and a wheel 2140. The first left second sensor 2110 and the second left third sensor 2120 are combined to form a combination sensor. The first left second sensor 2110 installed on an outer region of the combination sensor can be used for Y/Z translation commands while the third sensor 2120 installed on the inner region of the combinations sensor can be used for yaw/roll commands generation.

Figure 17:
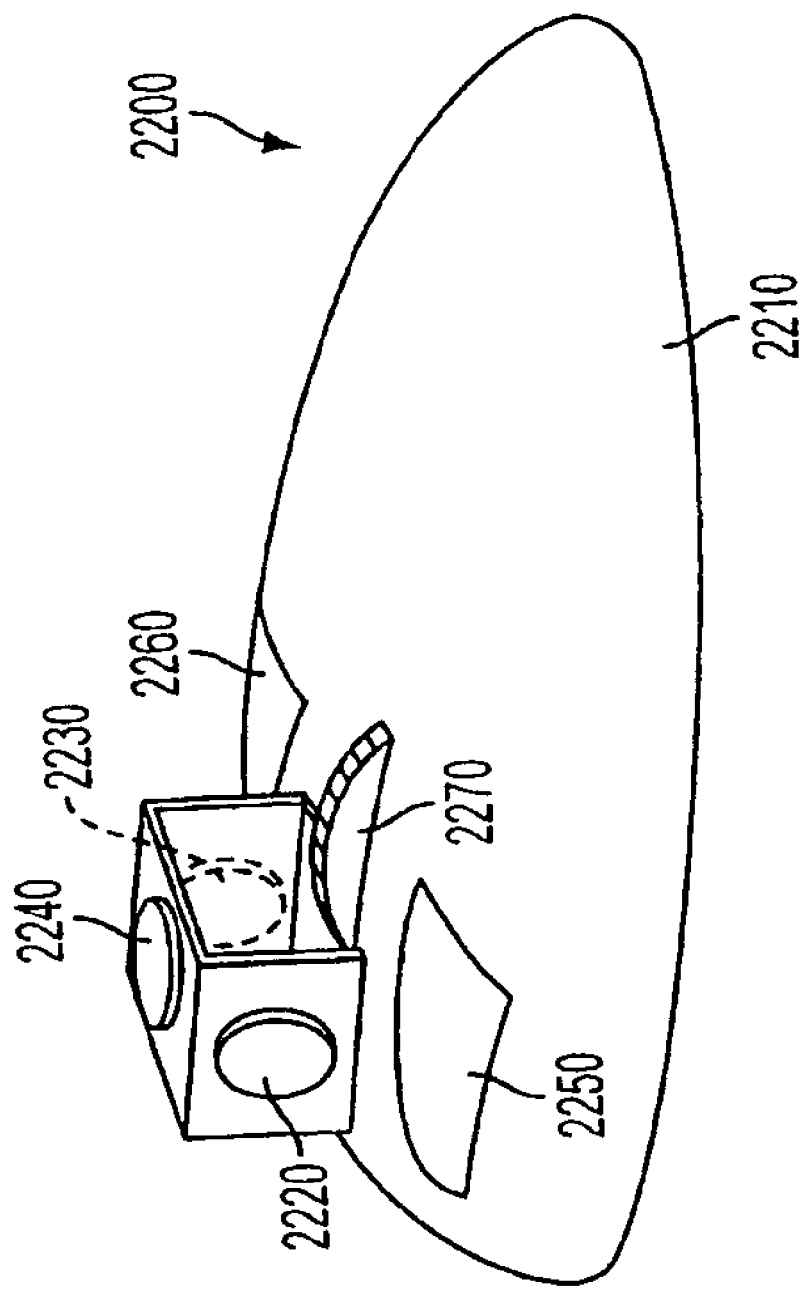

FIGS. 17-19 illustrate alternate embodiments having three sensors on top of a chassis. In FIG. 17, a device 2200 is illustrated with three elevated sensors. As shown, a chassis 2210, which is formed as a mouse body, includes an elevated third sensor 2220, an elevated second sensor 2230, an elevated first sensor 2240, a left mouse button 2250, a right mouse button 2260 and a wheel 2270.

Figure 18B:
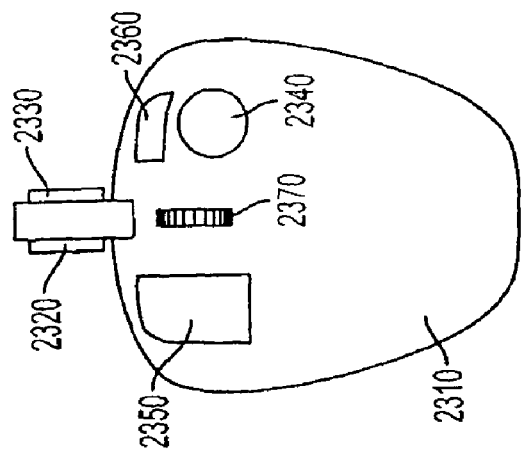
Figure 18A:
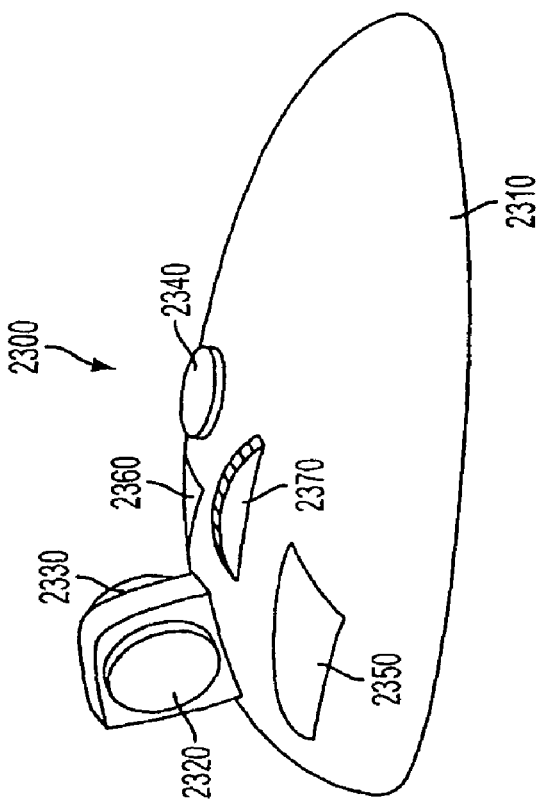

In FIG. 18A, a device 2300 is illustrated with two elevated sensors. As shown, a chassis 2310, which is formed as a mouse body, includes an elevated third sensor 2320, an elevated second sensor 2330, a first sensor 2340, a left mouse button 2350, a right mouse button 2360 and a wheel 2370. FIG. 18B illustrates an overhead view of the device 2300 shown in FIG. 18A.

Figure 19B:
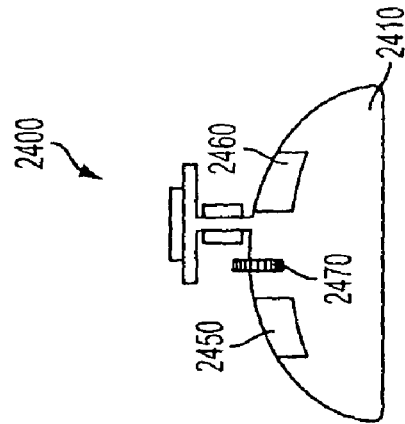
Figure 19A:
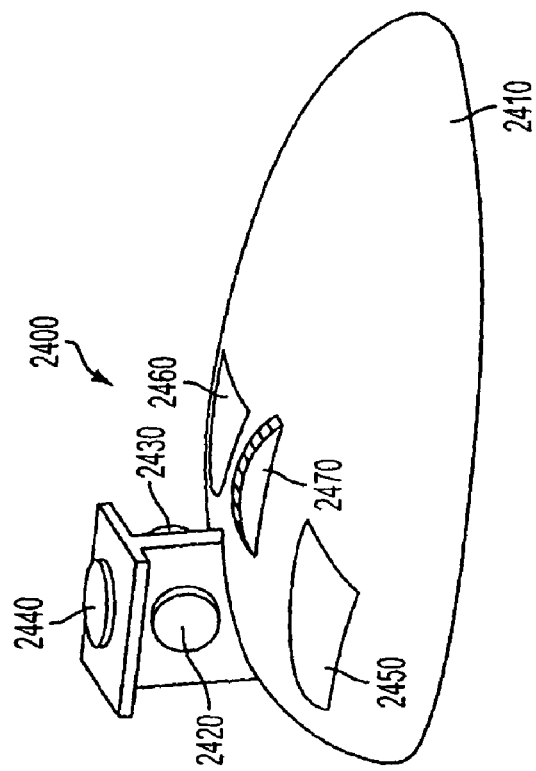

In FIG. 19A, a device 2400 is illustrated with three elevated sensors in a T structure. As shown, a chassis 2410, which is formed as a mouse body, includes an elevated third sensor 2420, an elevated second sensor 2430, a first sensor 2440, a left mouse button 2450, a right mouse button 2460 and a wheel 2470. FIG. 19B illustrates an overhead view of the device 2400 shown in FIG. 19A.

The embodiments illustrated above are for exemplary purposes only and should not be construed as limiting, as other embodiments will be apparent to one skilled in the art. For example, only one button can be elevated, the mouse buttons can be removed, the wheel can be removed, the elevated buttons can form a combination sensor, the elevated sensors can protrude from the side of the chassis, among others.

Selection of Sensors

A variety of sensors can be employed in conjunction with various other embodiments. FIGS. 20A-20E illustrates various sensors capable of providing input control signals representing two degrees of freedom, in accordance with an exemplary embodiment. Sensor 3000 depicts an analog sensor and its printed circuit board ("PCB") to provide X/Y positions in local coordinates on PCB by gently pushing the circle shaped surface of the sensor. Touching by finger, the stem of the sensor will incline and generate an X/Y signal depending on how much the sensor stem is inclined thereby generating input control signals representing motion in two degrees of freedom. The PCB on this sensor will process raw analog signals and convert it into digital signals that can be used for the microprocessor of computer.

For example, an 8-bit resolution type of the analog sensor will generate a range of 0 through 255 data points of X and Y values depending on its stem angle. As long as user is touching the analog sensor, the sensor continuously generates specific X, Y data corresponding to finger force and direction of force. The values of X, Y data in local coordinates can be used as velocity commands in a 3D graphic application. The analog sensor is commercially available from a number of vendors such as DomePoint™ sensor from Fujitsu Component Co. Ltd., in Japan.

Sensor 3100 depicts a 4-way digital button and its related PCB. The digital sensor provides four independent digital ON-OFF signals (North, East, South, West) which can be used as input control signals representing motion in two degrees of freedom. Sensor 3200 depicts an 8-way digital button and its related PCB. The digital sensor 3200 provides eight independent digital ON-OFF signals which can be used as input control signals representing motion in two degrees of freedom.

The digital signals of these digital buttons can also be used as velocity commands. For example, if a user pushed a North point of the digital button, then a (1,0,0,0) signal is generated. If the user pushed an East point of digital button, then a (0,1,0,0) signal is generated. The values of digital data in the local coordinates can be used as velocity commands such as a constant velocity command of Y+translation and X+translation, respectively, in a 3D graphic application.

Sensor 3300, known as a touchpad, provides an X/Y finger position in local coordinates of the sensor surface. The touchpad sensor is commercially available as Synaptics TouchPads from Synaptics, Inc. in San Jose Calif., USA. The touchpad was originally used as an alternate mouse equivalent input device and provides the signal of "change of finger position" as a signal for 2D cursor control. The touchpad sensor 3300 can be used to generate input control signals representing two degrees of freedom. However, simple application of the touchpad signal to 3D graphic applications will not generate a velocity command because the touchpad signal will be zero when the user stops his/her finger movement on the touchpad surface.

In order to utilize the touchpad signal as velocity commands for 3D graphic applications, interface software can optionally convert "change of finger position" to a velocity command as shown below. The following example pseudo computer program can be used as a basis for conversion of a touchpad signal to a velocity command for 3D graphic applications:

```
////// Pseudo Code ////////////
End-less loop
[ START
    Get current touchpad data( data of finger position change
    DelX(i), scan cycle = i th );
        If the data of position change is not zero value,
    // This means user is moving his finger. //
        Then, make velocity command Vx(i) = A*DelX(i);
    // Where A is a constant value or gain. //
        If position change is zero value and the status of finger touch
        is YES,
    // This means user stopped moving but still touching. //
        Then, use velocity command Vx(i-1) as current velocity;
            Vx(i) = Vx(i-1);
```

-continued

```
// Use velocity data of last scan cycle. //
    If position change is zero value and the status of finger touch
    is NO,
// This means user released his finger on touchpad. //
    Then use velocity command = 0 as current velocity;
        Vx(i) = 0;
    Return to START and process for next scan cycle;
]
End of loop
///////////////////////////// End of Pseudo Code /////////////////////
```

Using the above-listed pseudo-code, the touch based sensor can, for example, be used for velocity command generation for 3D manipulation. When users just move their fingers just slightly, the velocity command can be continuously generated even after the user's finger movement has stopped.

Figure 20A:
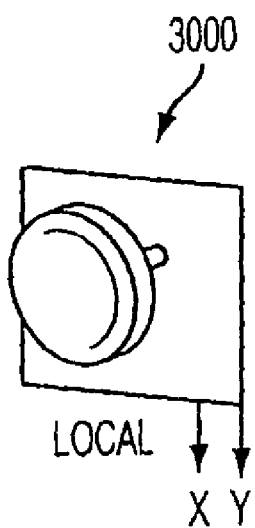
FIGS. 20A-20E illustrates various sensors capable of providing two degrees of freedom commands, in accordance with an exemplary embodiment.
Figure 20B:
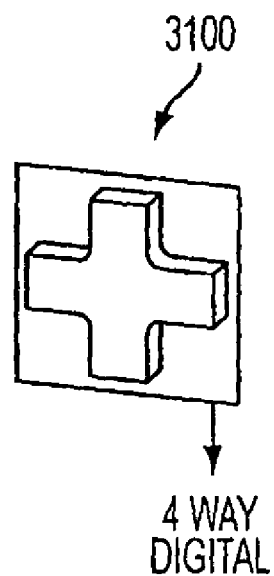
Figure 20C:
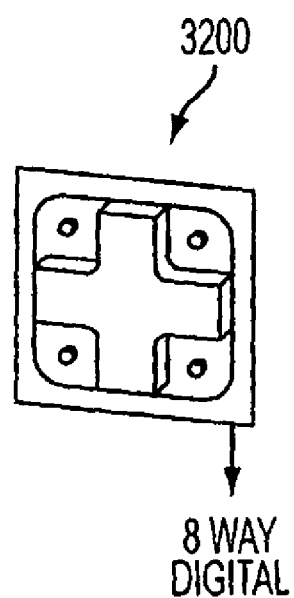
Figure 20D:
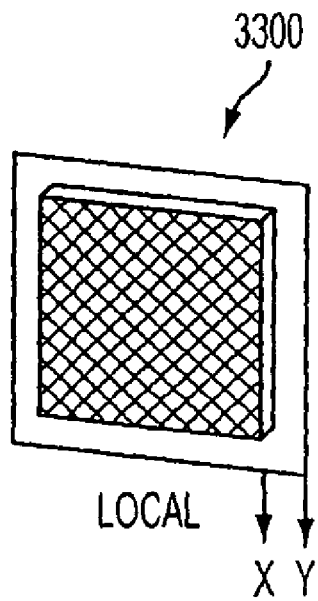
Figure 20E:
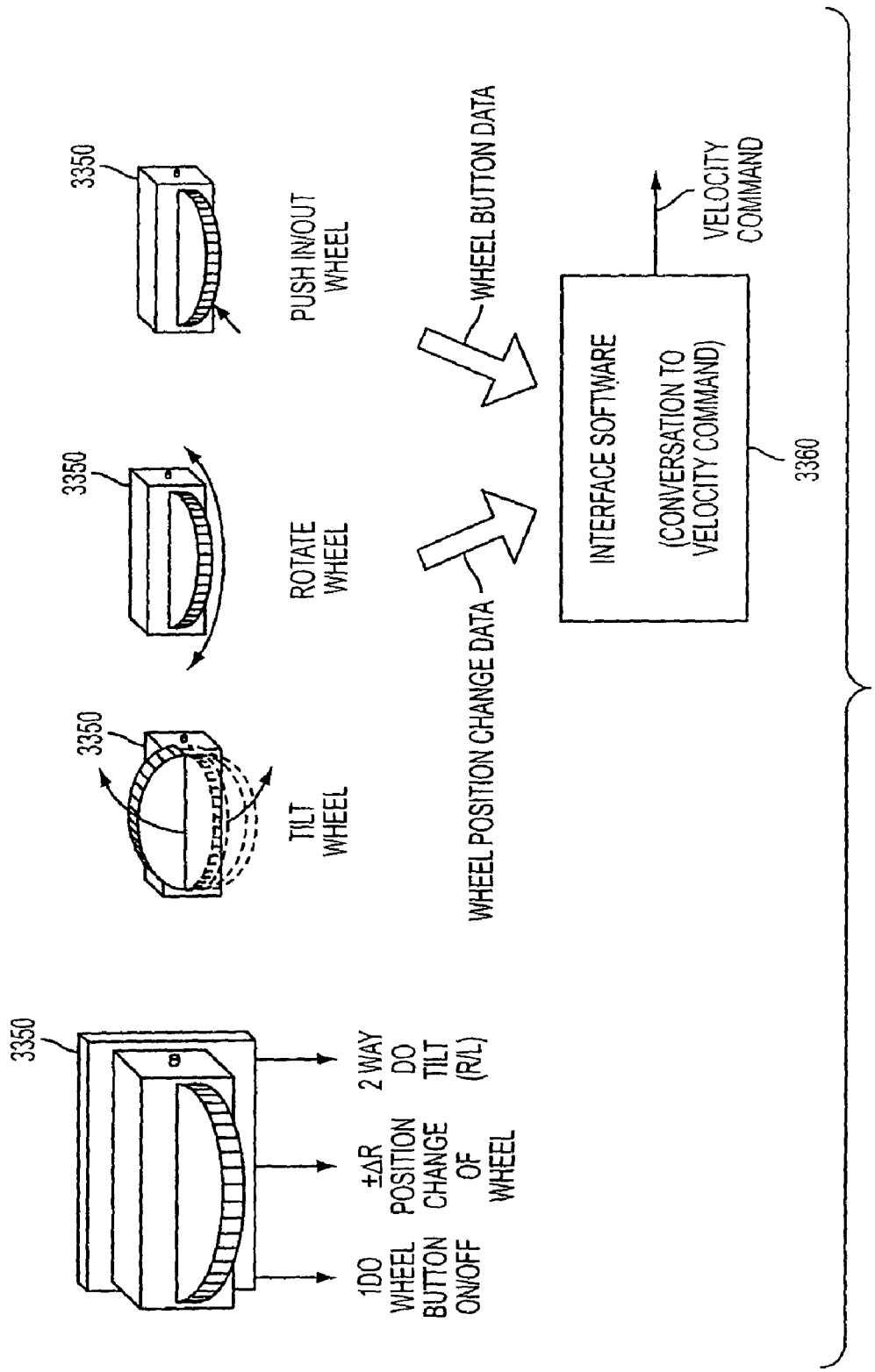
Figure 21A:
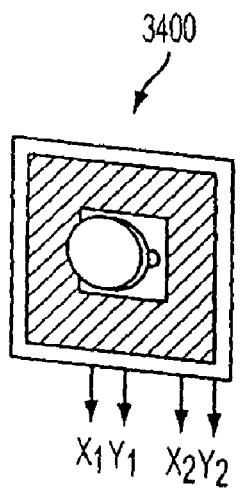
FIGS. 21A-21E illustrate various four degrees of freedom sensor components comprised of two independent two degree of freedom sensor components, in accordance with an exemplary embodiment.
Figure 21B:
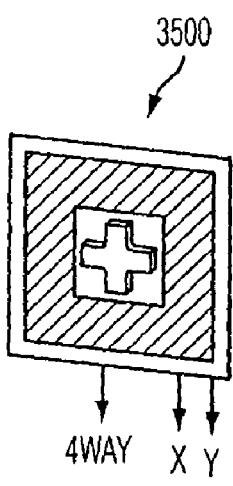
Figure 21C:
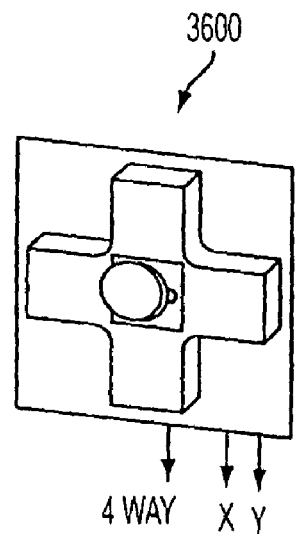
Figure 21D:
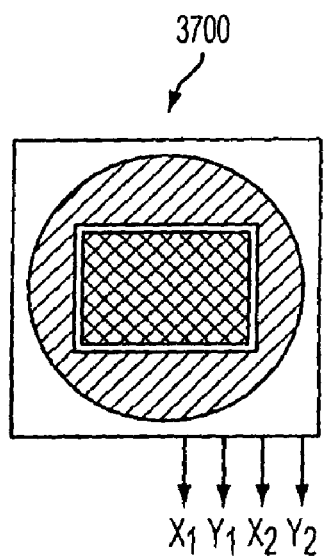
Figure 21E:
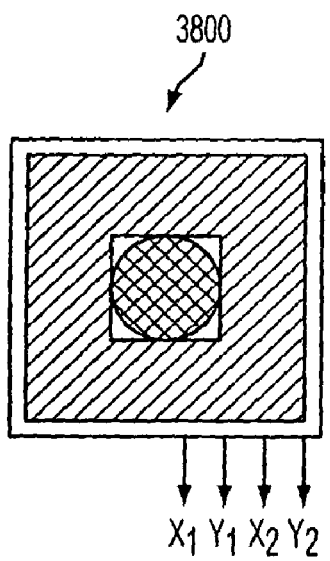

FIG. 20E illustrates a tilt wheel component 3350 that can also be implemented as a two degrees of freedom input sensor, in accordance with an exemplary embodiment. The tilt wheel 3350 can optionally provide a rotational position change of the tilt wheel in local coordinates of the wheel, digital signal of wheel DOWN/UP status, and digital ON/OFF signals as a result of pushing the wheel up and down or turning the tilt wheel towards the left or right, all of which can be used to generate input control signals representing motion in at least two degrees of freedom. Tilt wheels of this sort are commercially available from the Microsoft Corp. of Redmond, Wash. The tilt wheel can be modified to provide a one degree of freedom digital signal in addition to a "change of rotational position" signal which is an original signal of the wheel component. Applying signals of the tilt wheel to 3D graphic applications will not generate two degrees of freedom velocity commands. This is due to the rotational position signal being zero when a user stops his/her finger movement on the wheel surface. (The digital signals by tilting of wheel can be used as one degree of freedom velocity commands.)

In order to utilize the tilt wheel signals as two degrees of freedom velocity commands for 3D graphic applications, interface software 3360 is preferably needed to convert "change of rotational position" to velocity command. The following exemplary pseudo-code can be used as a basis to convert a tilt wheel signal to velocity command for 3D graphic applications:

```
////// Pseudo Code for tilt wheel /////////////
End-less loop
[ START
Get current wheel rotation data and status of wheel center
button(wheel DOWN/UP)
( data of rotational position change DelRotation(i), scan cycle = i th );
If status of wheel is DOWN,
Then
    {
    If the data of rotational position change DelRotation(i) is not
    zero value at previous scan cycle,
        // This means user was moving his finger just
        // before pushing down on the wheel.
    Then, make velocity command Vw(i) = A*DelRotation(i);
        Where A is a constant value or gain.
    If rotational position change is zero value at previous scan
    cycle,
        // This means user does not rotate wheel.
    Then, use velocity command Vw(i) = 0;
    }
Return to START and process for next scan cycle;
]
End of loop
///////////////////////////// End of Pseudo Code ////////////////////
```

Using the above-listed algorithm, the tilt wheel can be used for two degrees of freedom velocity command generation for 3D manipulation, by way of non-limiting example.

FIGS. 21A-21E illustrate various four degrees of freedom sensor components comprised of two independent two degrees of freedom sensor components, in accordance with an exemplary embodiment. Combined sensor 3400 includes an analog sensor 3000 as illustrated in FIG. 20A and a touchpad sensor 3300 as illustrated in FIG. 20D. The combined sensor 3400 provides two independent local X/Y signal representing motion in four degrees of freedom corresponding to the location of the user's finger touch. Combined sensor 3500 includes a 4-way digital button 3100 as illustrated in FIG. 20B and a touchpad sensor 3300 as illustrated in FIG. 20D. Combined sensor 3600 includes an analog sensor 3000 as illustrated in FIG. 20A and a 4-way digital button 3100 as illustrated in FIG. 20B. Combined sensor 3700 and 3800 include two independent touchpads as illustrated in FIG. 20D.

Figure 22A:
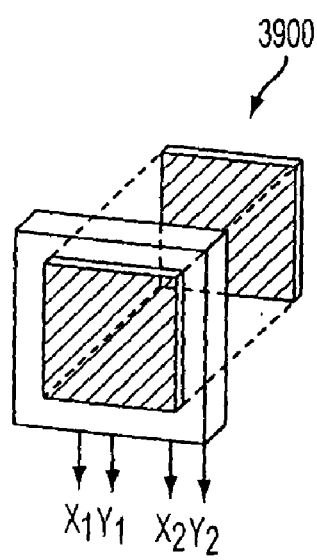
FIGS. 22A-22B illustrate yet another set of four degree of freedom sensor components made from a combination of two independent two degrees of freedom sensors, in accordance with an exemplary embodiment.
Figure 22A:
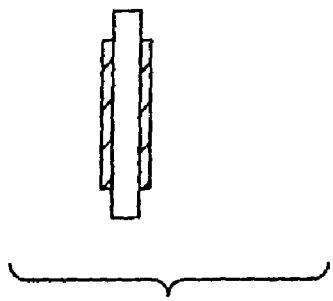
Figure 22B:
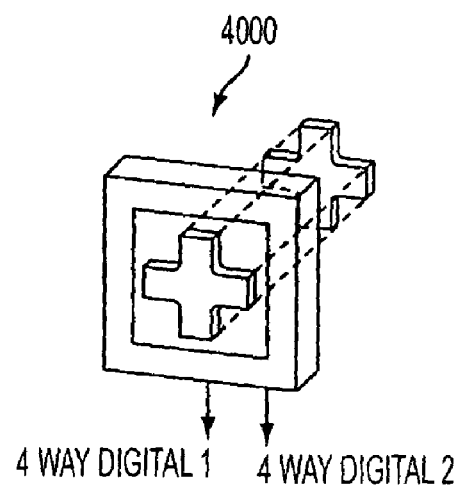
Figure 22B:
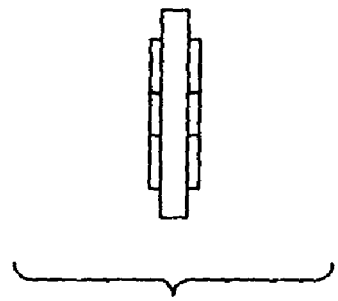
Figure 23A:
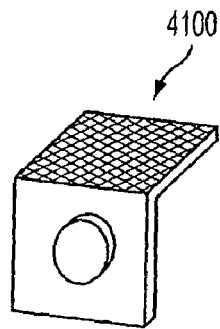
FIGS. 23A-23F illustrates additional four degrees of freedom sensor components that are made from two independent two degree of freedom sensors, in accordance with an exemplary embodiment.
Figure 23B:
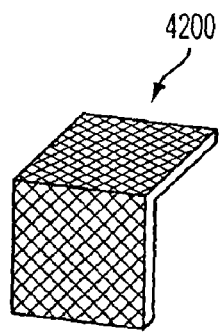
Figure 23C:
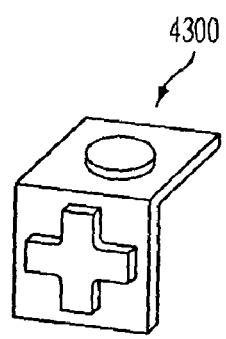
Figure 23D:
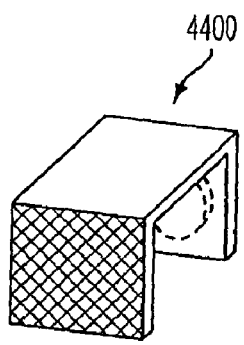
Figure 23E:
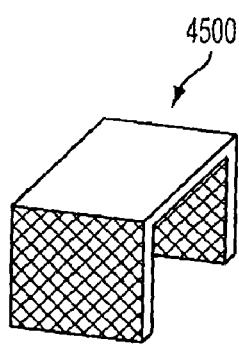
Figure 23F:
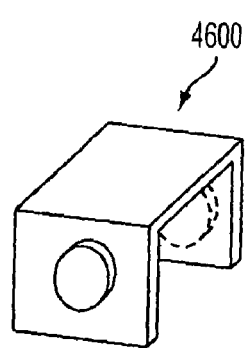

FIGS. 22A-22B illustrate yet another set of four degrees of freedom sensor components made from a combination of two independent two degrees of freedom sensors, in accordance with an exemplary embodiment. Combined sensor 3900 includes two touchpads and provides two independent X/Y position signals representing motion in four degrees of freedom corresponding to a location of the user's finger touch. Combined sensor 4000 includes two 4-way digital buttons. These combined sensor components are convenient for two finger gesture-based 3D commands (for example: yaw and roll) such as a twisting gesture accomplished by touching opposite directions the two sensors.

FIGS. 23A-23F illustrate additional four degrees of freedom sensor components that are made from two independent two degrees of freedom sensors, in accordance with an exemplary embodiment. Combined sensor 4100 and 4400 includes a touchpad and an analog sensor, and provide two independent X/Y position signals representing motion in four degrees of freedom corresponding to a location of the user's finger touch.

Combined sensor 4200 and 4500 includes two touchpads that provide two independent X/Y position signals representing motion in four degrees of freedom corresponding to a location of the user's finger touch. Combined sensor 4300 and 4600 includes a 4-way digital button and an analog sensor, and provide two independent X/Y position signals representing motion in four degrees of freedom corresponding to a location of the user's finger touch.

Figure 24:
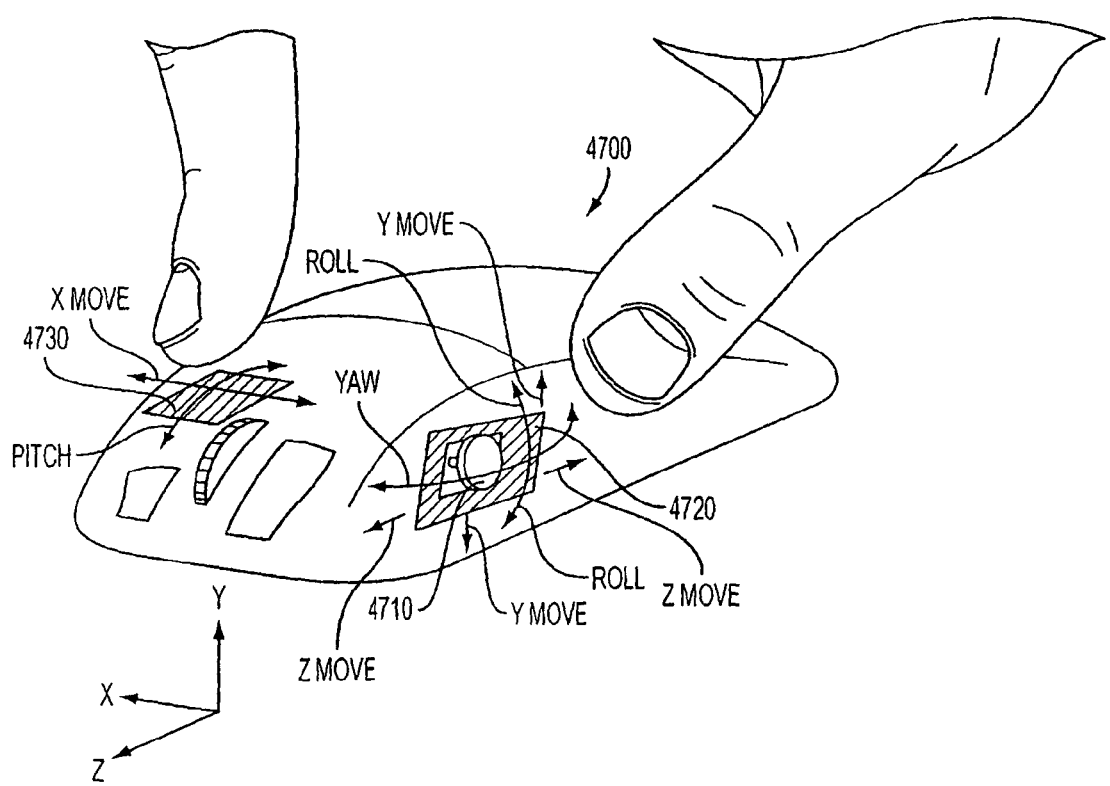
FIG. 24 illustrates a mouse that has various combinations of sensor components, in accordance with an exemplary embodiment.

FIG. 24 illustrates a mouse that has various combinations of sensor components, in accordance with an exemplary embodiment. In this particular embodiment, the analog sensor 4710 on the left side can be used for roll and yaw commands, the touchpad sensor 4720 installed on the outer region of the analog sensor 4710 can be used for Y/Z translation commands and the touchpad sensor 4730 on the top surface of the mouse body can be used for pitch and X translation commands.

Multi Dimensional Keyboards and Laptop Personal Computers

Figures 1, 25A:
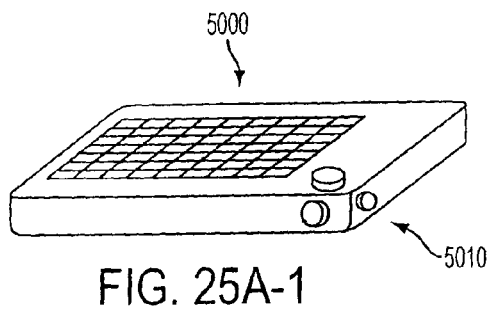
FIG. 25A illustrates conventional keyboards and laptop PC's that have been outfitted an additional multidimensional input device, in accordance with an exemplary embodiment.
Figures 2, 25A:
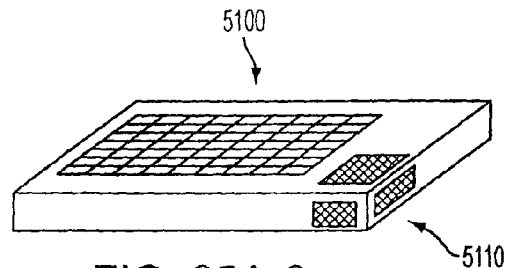
Figures 3, 25A:
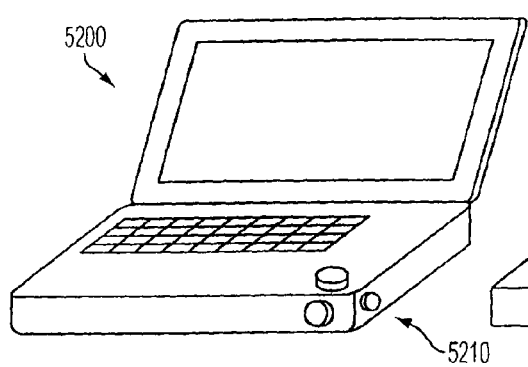
Figures 4, 25A:
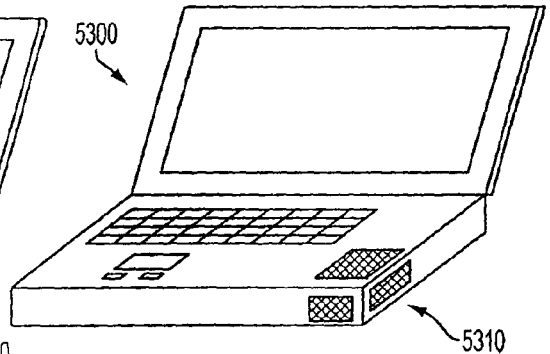
Figure 25B:
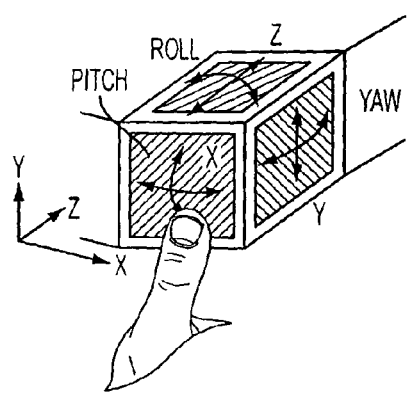
FIG. 25B illustrates a 3D command mapping of three sensors (three small touchpads installed at corner of right hand side), in accordance with an exemplary embodiment.

FIG. 25A illustrates conventional keyboards and laptop PC's having an integrated multidimensional device, in accordance with an exemplary embodiment. A keyboard 5000, as shown in FIG. 25A-1, has three independent analog sensors coupled to a chassis 5010. The chassis 5010 is integrated into the keyboard 5000. An alternate keyboard, as shown in FIG. 25A-2, 5100 has three independent touchpad sensors coupled to a chassis 5110. The chassis 5110 is integrated into the keyboard 5100. A laptop 5200 is shown in FIG. 25A-3 with an integrated chassis 5210 having analog sensors. Another laptop 5300 is shown in FIG. 25A-4 with an integrated chassis 5310 having touchpad sensors. The sensors are capable of generating input control signals representing motion along the X-Y plane, Y-Z plane, and X-Z plane respectively. The embodiments shown in FIG. 25A can be easily modified by different sensors or combined sensor components such as the ones shown in FIGS. 20-23. FIG. 25B illustrates a 3D command mapping of three sensors (three small touchpads installed at corner of right hand side), in accordance with an exemplary embodiment.

Figure 26:
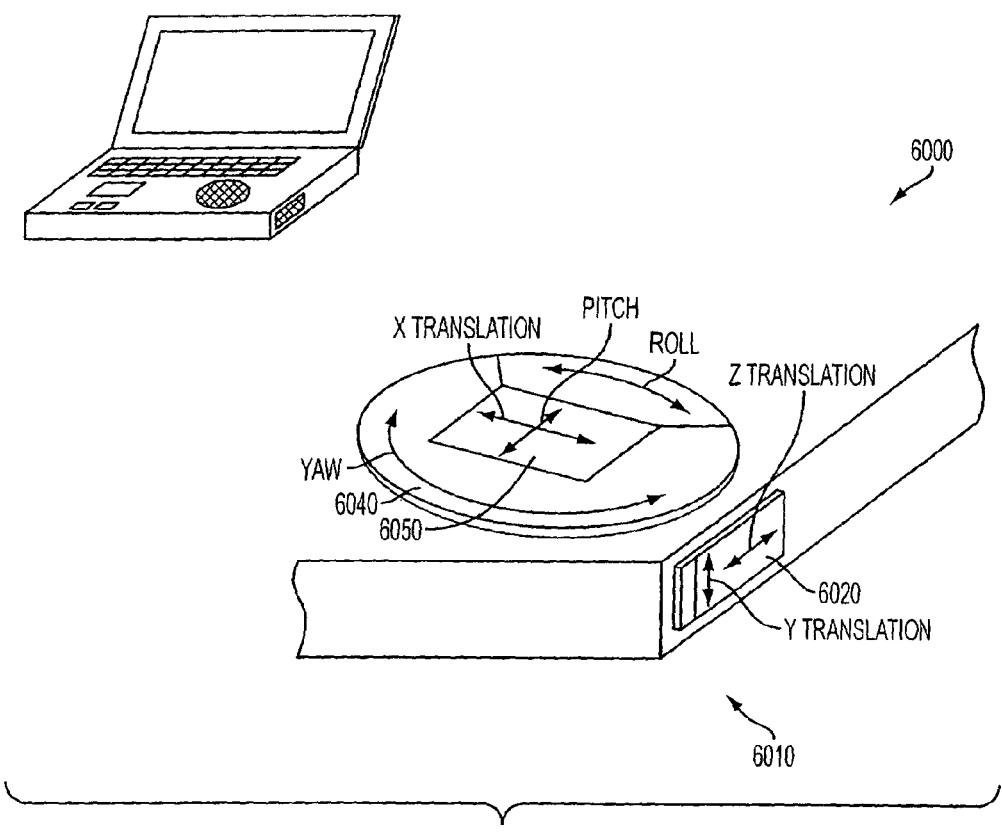
FIG. 26 illustrates an alternate multidimensional input device for a laptop PC, in accordance with an exemplary embodiment.

FIG. 26 illustrates an alternate multidimensional input device 6000 for a laptop PC, in accordance with an exemplary embodiment. In FIG. 26, a chassis 6010 is integrated into the laptop computer. The chassis 6010 include a rectangle shaped touchpad 6020 installed on the right side of the laptop PC to generate Y axis and Z axis translation commands. The chassis 6010 also includes two independent, but combined at one location, touchpad sensors 6040, 6050 (inner region and outer region) installed on a top surface of the right corner of the computer body. The touchpad sensor 6050 on the inner region can be used to generate X axis translation and pitch commands. The outer region of the touchpad sensor 6040 is functionally further divided into two sub-regions (forward sub region and backward sub region). The signal from the forward sub-region can be used for initiating a roll command generation and a signal from the backward sub-region can be used for a yaw command generation. Two independent touchpads on the top surface can be implemented using a single touchpad by functionally dividing an area of the touchpad surface and assigning different 3D commands depending on the position data of the finger touch. However, a user cannot simultaneously generate two kinds of 3D commands such as simultaneous commands of roll and X translation on this touchpad located on top. This is because currently available touchpads cannot discriminate between two different touch points on single touchpad component.

Figure 27:
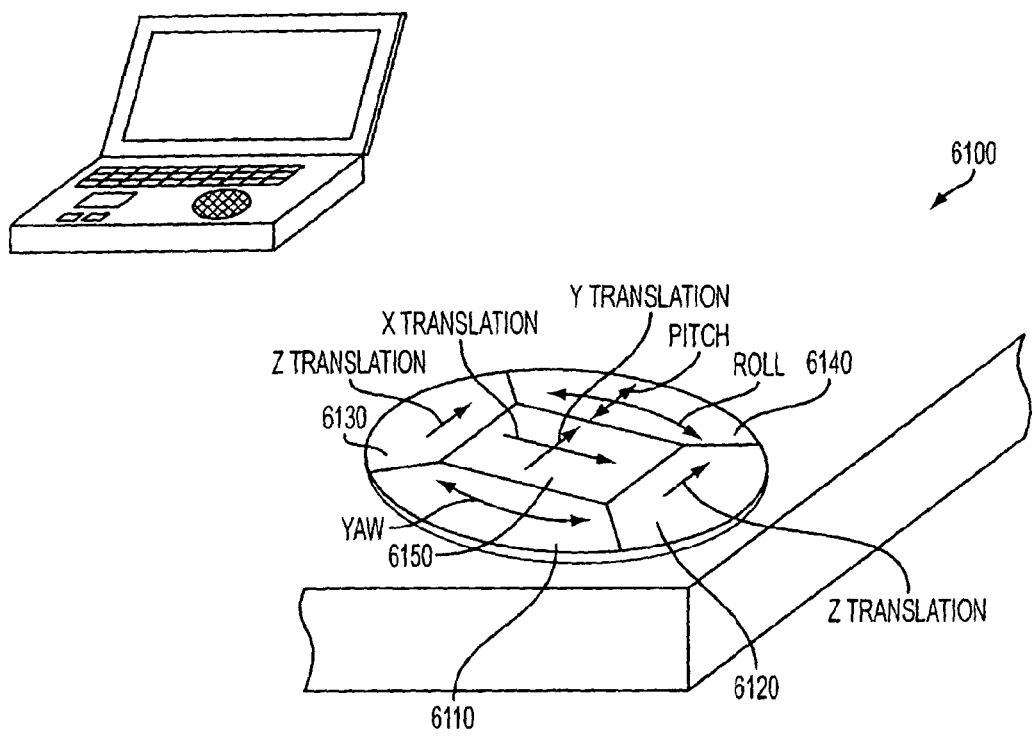
FIG. 27 illustrates yet another alternate implementation of a multidimensional input device utilizing a single touchpad, in accordance with an exemplary embodiment.

FIG. 27 illustrates yet another other alternate implementation of a multidimensional input device 6100 utilizing a single touchpad, in accordance with an exemplary embodiment. In this case, an outer region is divided into four areas 6110, 6120, 6130, 6140 and as a result there are a total of five different areas (an inner area 6150 and four outer areas 6110, 6120, 6130, 6140) used to generate 3D commands. As shown in FIG. 27, the 3D command mapping violates the previously mentioned "intuitiveness rule" in terms of Y axis translation due to the elimination of touchpad on right side. In other words, Y axis command direction is as same as Z axis command direction. Therefore, training can be required to become accustomed to this alternate arrangement.

Multi Dimensional Joysticks

Figure 28A:
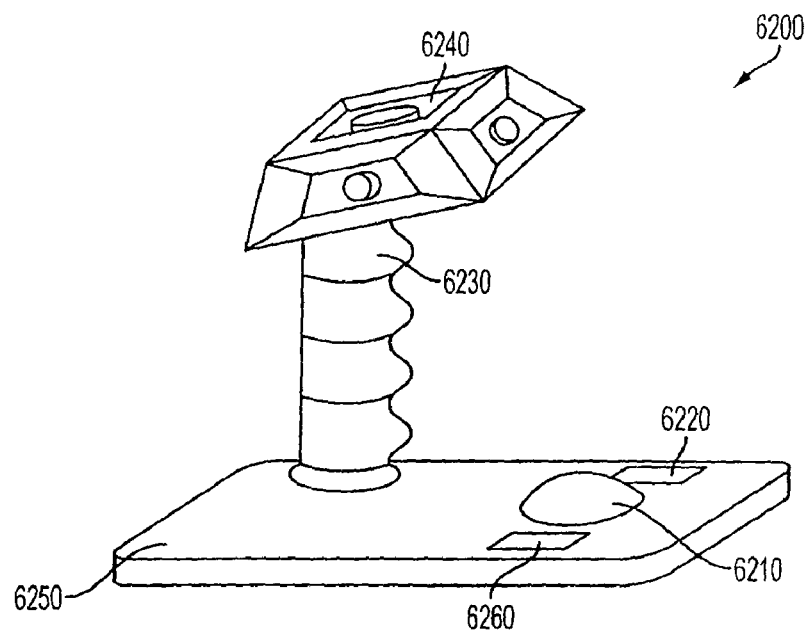
FIGS. 28A-28K illustrate various ten degrees of freedom joysticks, in accordance with an exemplary embodiment.
Figure 28B:
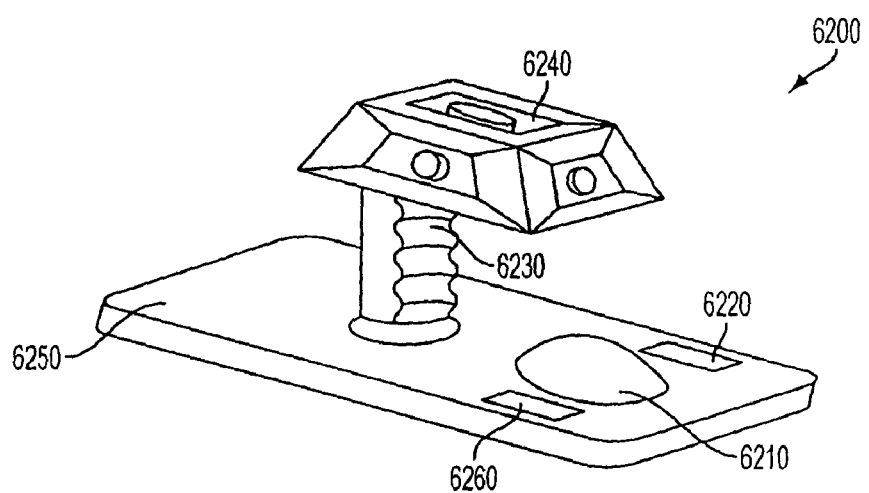
Figure 28C:
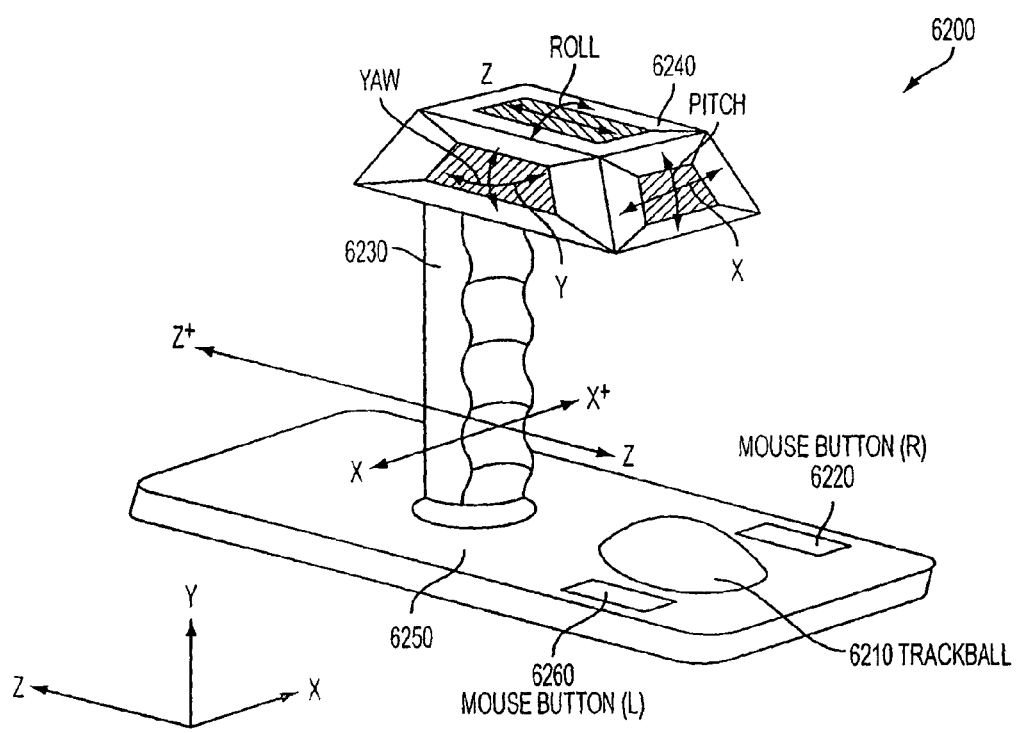
Figure 28D:
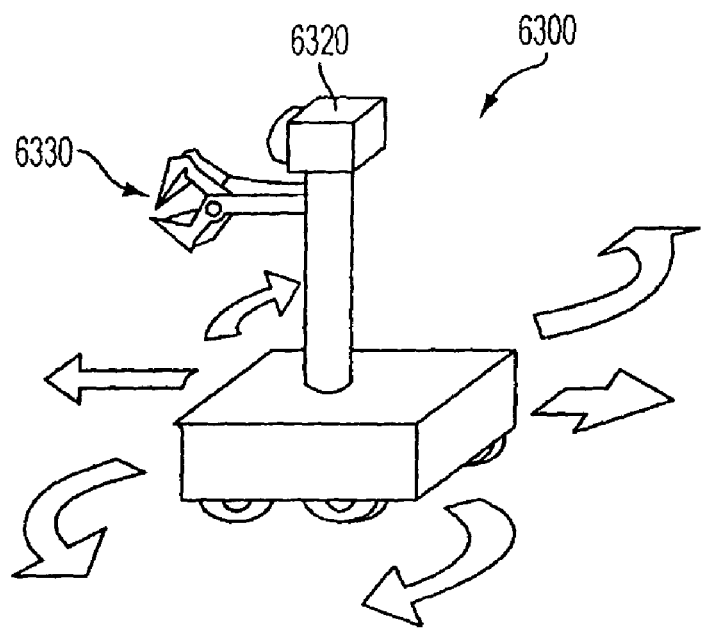

FIGS. 28A-28K illustrate various ten degrees of freedom joysticks, in accordance with an exemplary embodiment. FIGS. 28A-28B depict the design concept of a ten degrees of freedom joystick based on an application of the design concept described in many of the previous figures. The joystick 6200 in FIGS. 28A, 28B and 28C include a trackball 6210, a left mouse button 6260, a right mouse button 6220, a joystick stem 6230, a base 6250, and a chassis 6240 with three independent sensors. A bottom of the joystick stem 6230 is coupled to the base 6250 while the chassis 6240 is coupled to a top of the joystick stem 6230. As illustrated, the sensors in FIGS. 28A and 28B are analog sensors while the sensors in FIG. 28C are touchpad sensors. The sensors can follow the "intuitive mapping rule". The joystick as shown in FIGS. 28A, 28B and 28C can potentially be applied to 3D manipulation of a robot.

Figure 28E:
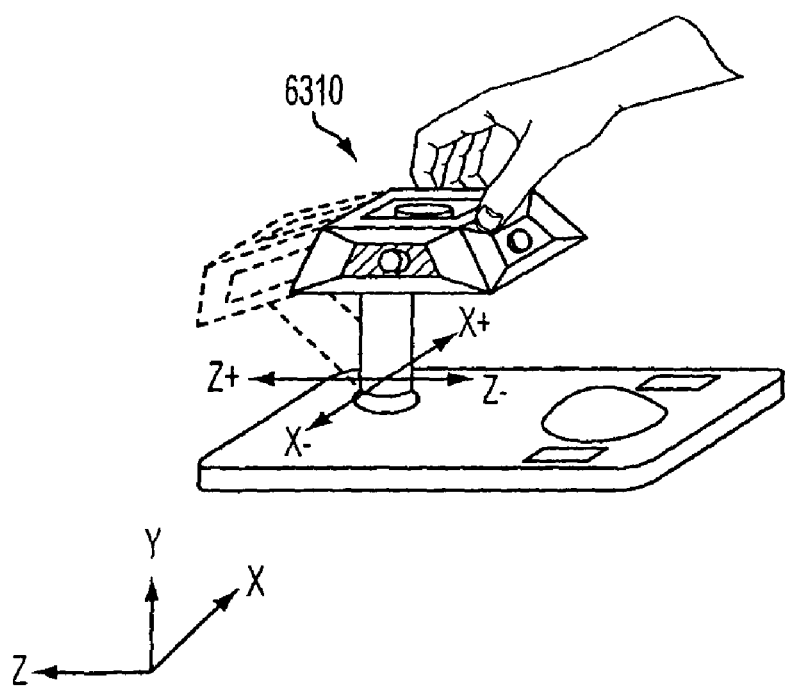
Figure 28F:
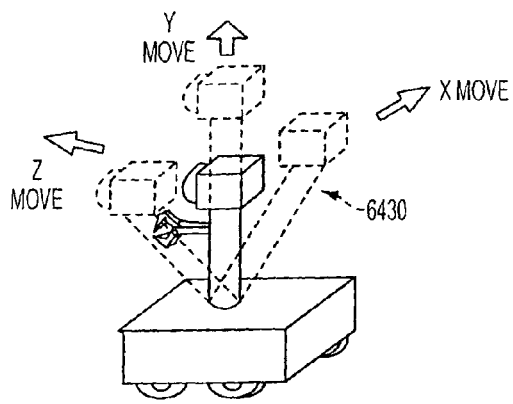
Figure 28G:
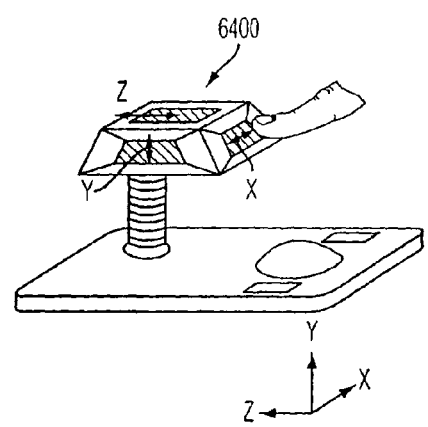
Figure 28H:
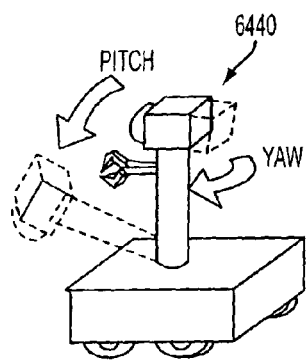
Figure 28I:
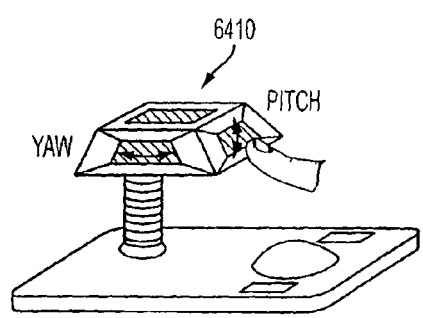
Figure 28J:
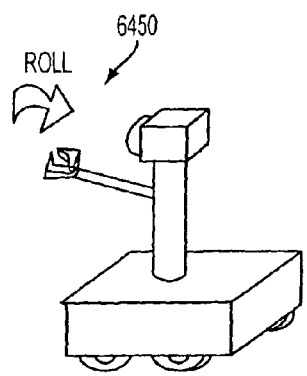
Figure 28K:
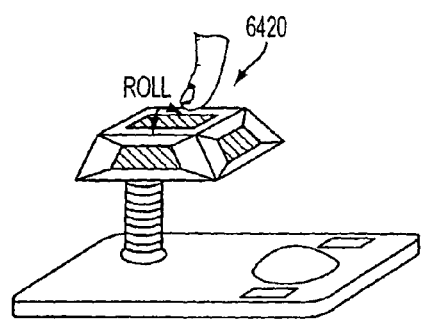

FIGS. 28D-28K illustrate 3D manipulation of an Automatic Guided Vehicle ("AGV"). FIG. 28E shows a remote control 6310 of the AGV 6300 depicted in FIG. 28D. The AGV 6300 has a CCD camera 6320 installed on the movable stem and a gripper 6330. The remote 6310 is capable of driving an AGV 6300 on an industrial floor by utilizing command signals. A user of the ten degrees of freedom joystick 6310 can generate the commands of forward/backward drive of AGV 6300 by pushing the joystick forward and backward. A user can also generate commands of forward turn to right/left or backward turn right/left by pushing the joystick to the right or left direction.

FIG. 28F-28K shows an implementation to remotely control an inspection camera view and roll control of a robot gripper 6400. The remote control includes a chassis 6400 having three touchpad sensors. The touchpad sensors correspond to movement of the components 6430 of the AGV. By dragging a finger on the touchpad 6410, a user can generate X,Y,Z translation, pitch and yaw for manipulation of a CCD camera 6440 mounted on the stem. By dragging a finger on the top touchpad 6420, a user can generate a roll command for a gripper of the AGV 6450.

Multi-Dimensional Handheld Controllers

Figure 29:
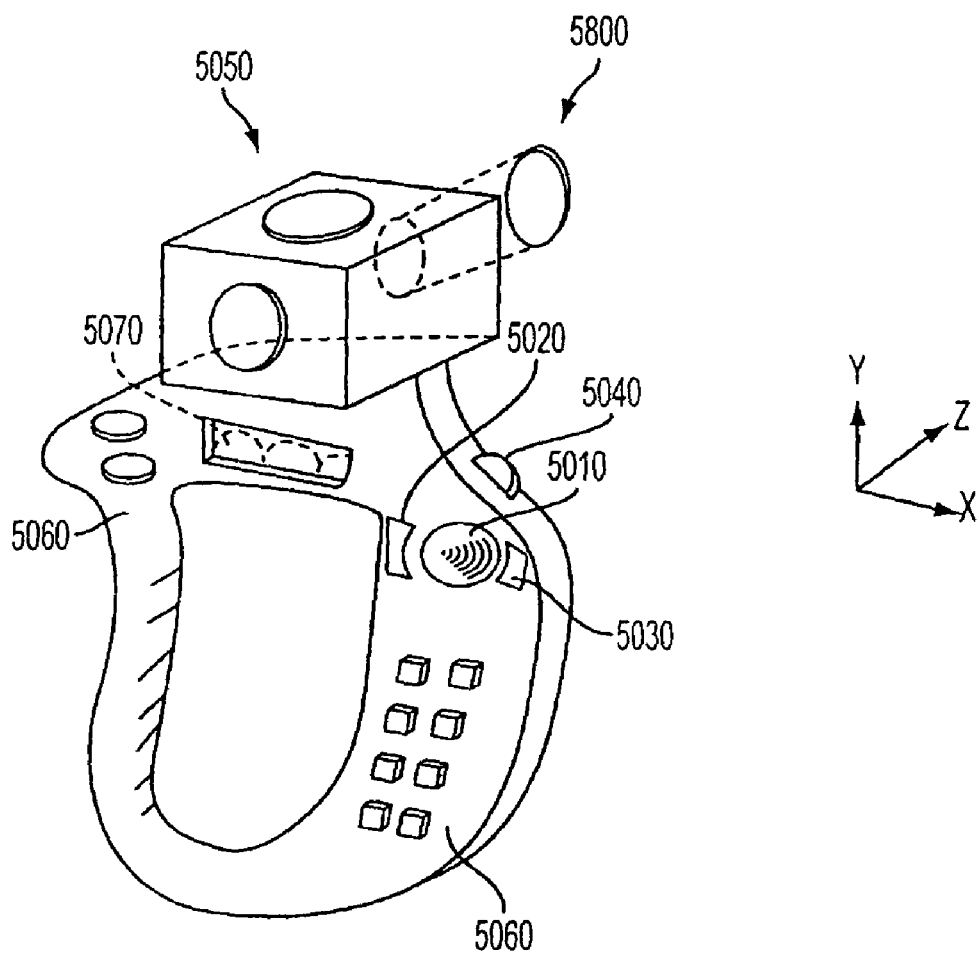
FIG. 29 illustrates a nine degrees of freedom handheld controller, in accordance with an exemplary embodiment.

FIG. 29 illustrates a nine degrees of freedom handheld controller, in accordance with an exemplary embodiment. The controller 5000 includes a trackball 5010, a left mouse button 5020, a right mouse button 5030, a wheel 5040, a chassis having three sensors 5050, ten programmable digital buttons (two buttons on the left side and eight buttons on the right side) 5060 and a small LCD screen 5070 for displaying a device status.

Figure 30A:
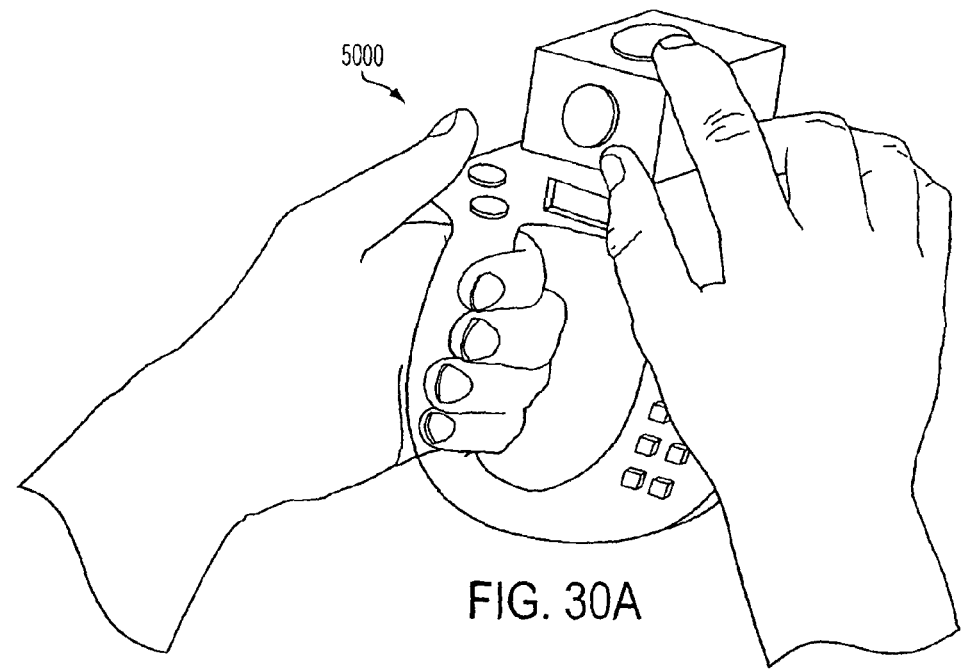
FIGS. 30A-30B illustrate how the nine degrees of freedom controller of FIG. 29 can be manipulated, in accordance with an exemplary embodiment.
Figure 30B:
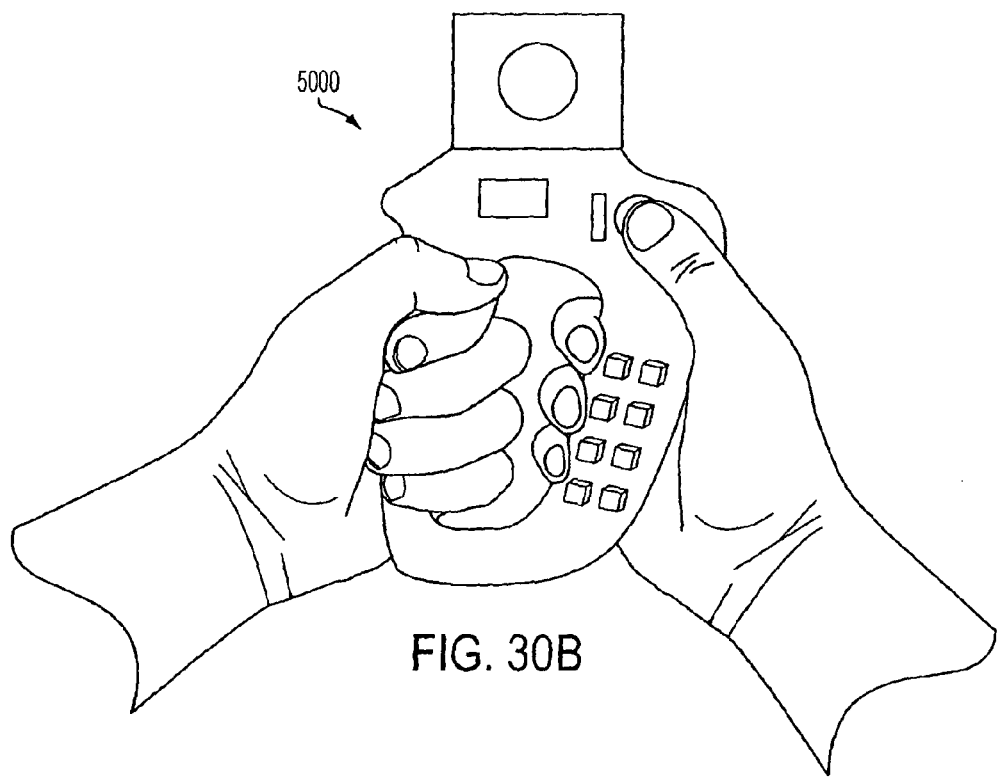

FIGS. 30A-30B illustrate how the nine degrees of freedom controller 5000 of FIG. 29 can be manipulated, in accordance with an exemplary embodiment. FIG. 30A depicts 3D mapping of the controller. The 3D command mapping concept is the combined set of a single finger operation and a two finger gesture based operation. A user will employ a twisting gesture (two fingers) to generate yaw and pitch on a front sensor and a back sensor. A user will also employ a pull gesture (two fingers) to generate X and Y translation commands on front sensor and back sensor. For Z translation, user drags a finger forward/backward on a top sensor and drags right/left on a top sensor to generate a roll command. FIG. 30B shows how to use the controller for 2D command control such as conventional cursor movement with a mouse button click.

Figure 31A:
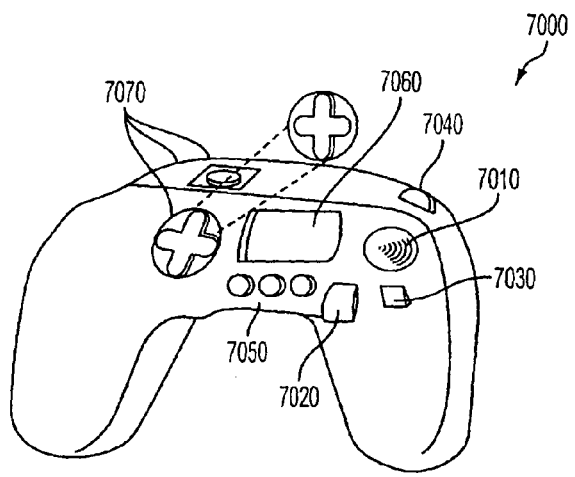
FIGS. 31A-31B illustrate another embodiment of a nine degrees of freedom handheld controller, in accordance with an exemplary embodiment.
Figure 31B:
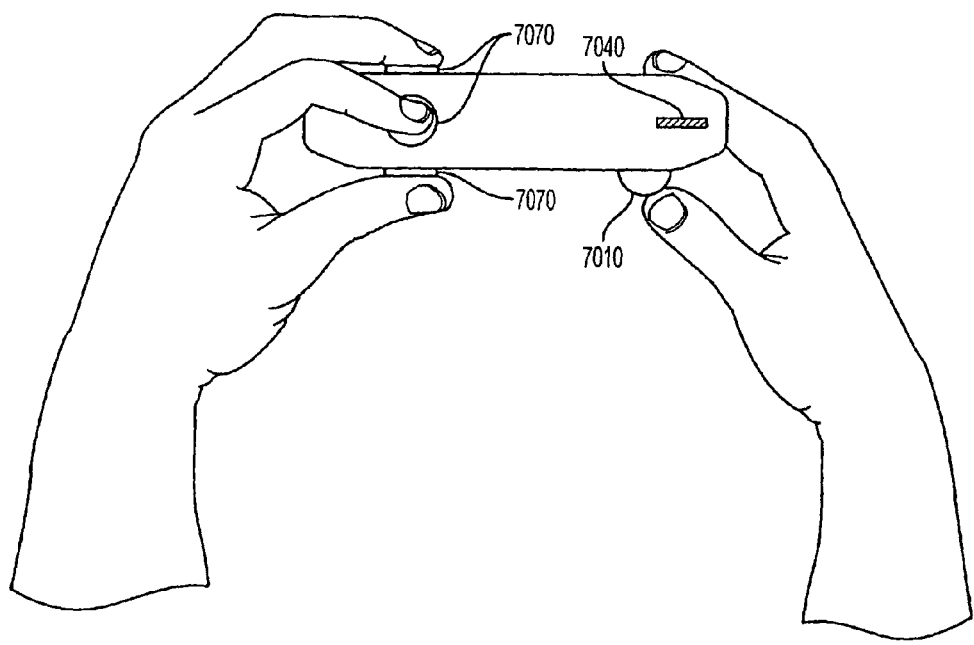

FIG. 31A and FIG. 31B illustrate another embodiment of a nine degrees of freedom handheld controller 7000, in accordance with an exemplary embodiment. The handheld controller 7000 includes a trackball 7010, a left mouse button 7020, a right mouse button 7030, a wheel 7040, a plurality of programmable buttons 7050, an LCD screen 7060, and an integrated chassis having three sensors 7070. The 3D command mapping for this controller is the same as the controller shown in FIG. 30B.

Interface Method with Computer

Software can optionally be employed to connect signals from a multidimensional input devices to a host PC in order to implement intuitive 3D command mapping between raw signals of the input device and final 3D manipulation commands in a 3D graphics application program on a host PC through a USB connection.

The Windows XP operating system provides a built-in USB kernel device driver for USB-HID (Human Interface Device) based input devices. As a result, it is not a requirement to develop a unique device driver. Instead, the built-in USB kernel device driver can be employed as a first step for data acquisition. After the Microsoft built-in USB kernel driver acquires the raw input data, a user-level interface software can be developed to acquire the raw input data using the Windows Application Program Interface ("API") function packages which can be written in popular computer languages such as the C/C++language.

Using an interface structure based on multiple logical devices for firmware and a host PC support software, new input functions can be developed on conventional 2D input device such as a conventional USB 2D mouse without modifying existing 2D input functions. The logical device is a sort of "virtual device" on an input device and any number logical devices can be defined on a single device. That is, multiple virtual devices can be implemented on a single input device.

Figure 32:
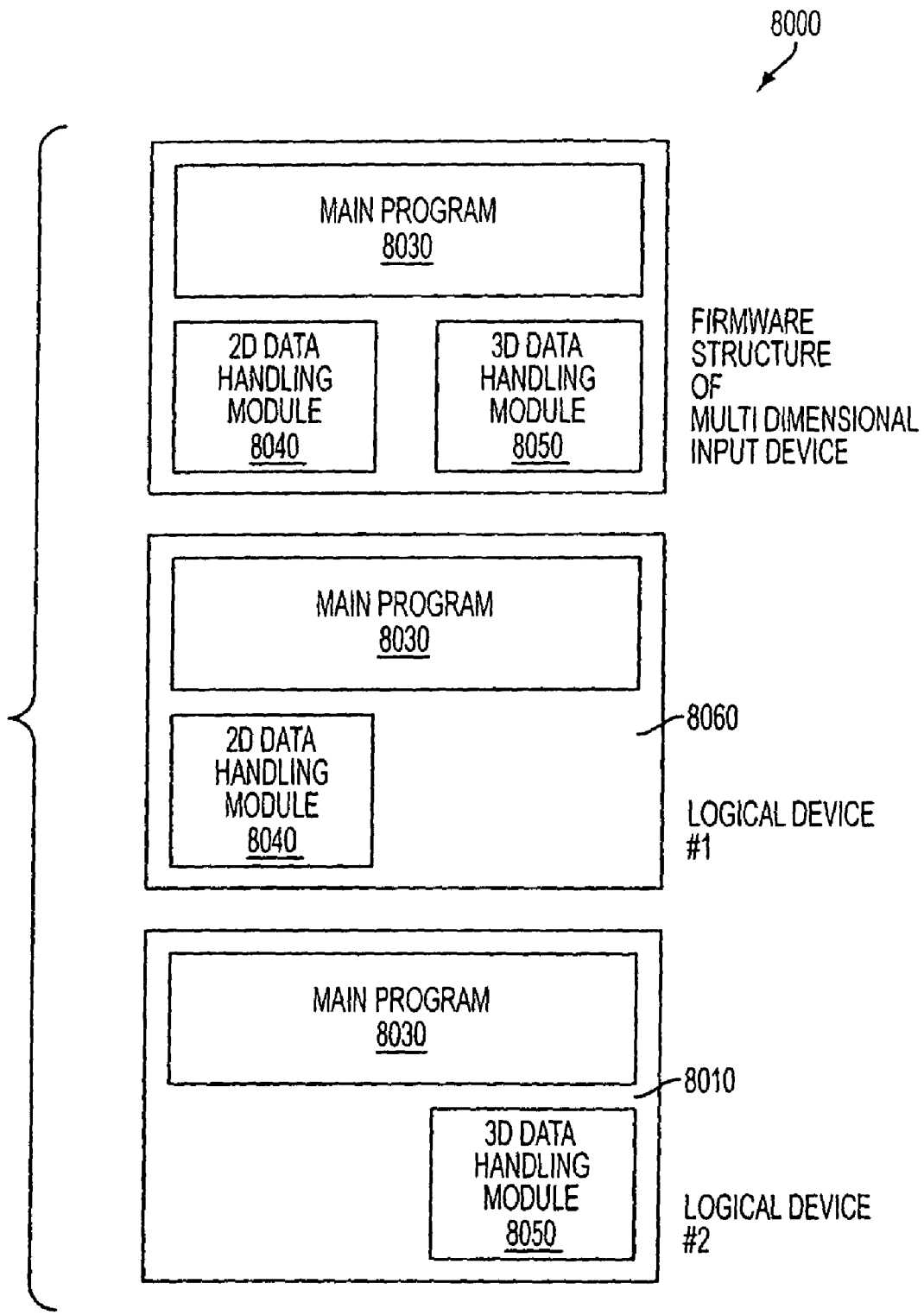
FIGS. 32-33 illustrate a system for interfacing a multidimensional device and a host PC, in accordance with an exemplary embodiment.

FIG. 32 illustrates a system 8000 for interfacing a multidimensional device and a host PC, in accordance with an exemplary embodiment. In FIG. 32 conventional 2D input functions such as mouse X/Y move, right/left/wheel button status, wheel rotation, can be defined as a logical device #1 8060. The main program 8030 firmware can be written to have separate two slave modules, 2D Data Handling Module 8040 and 3D Data Handling Module 8050. The main program 8030 of firmware defines and handles all of the 2D function input data as the data packet of logical device #1 8060. All 3D input functions, or independent six degrees of freedom input functions, can be defined as logical device #2 8010. The main program 8030 will define and handle all of the 3D function input data as the data packet of logical device #2 8010.

Figure 33:
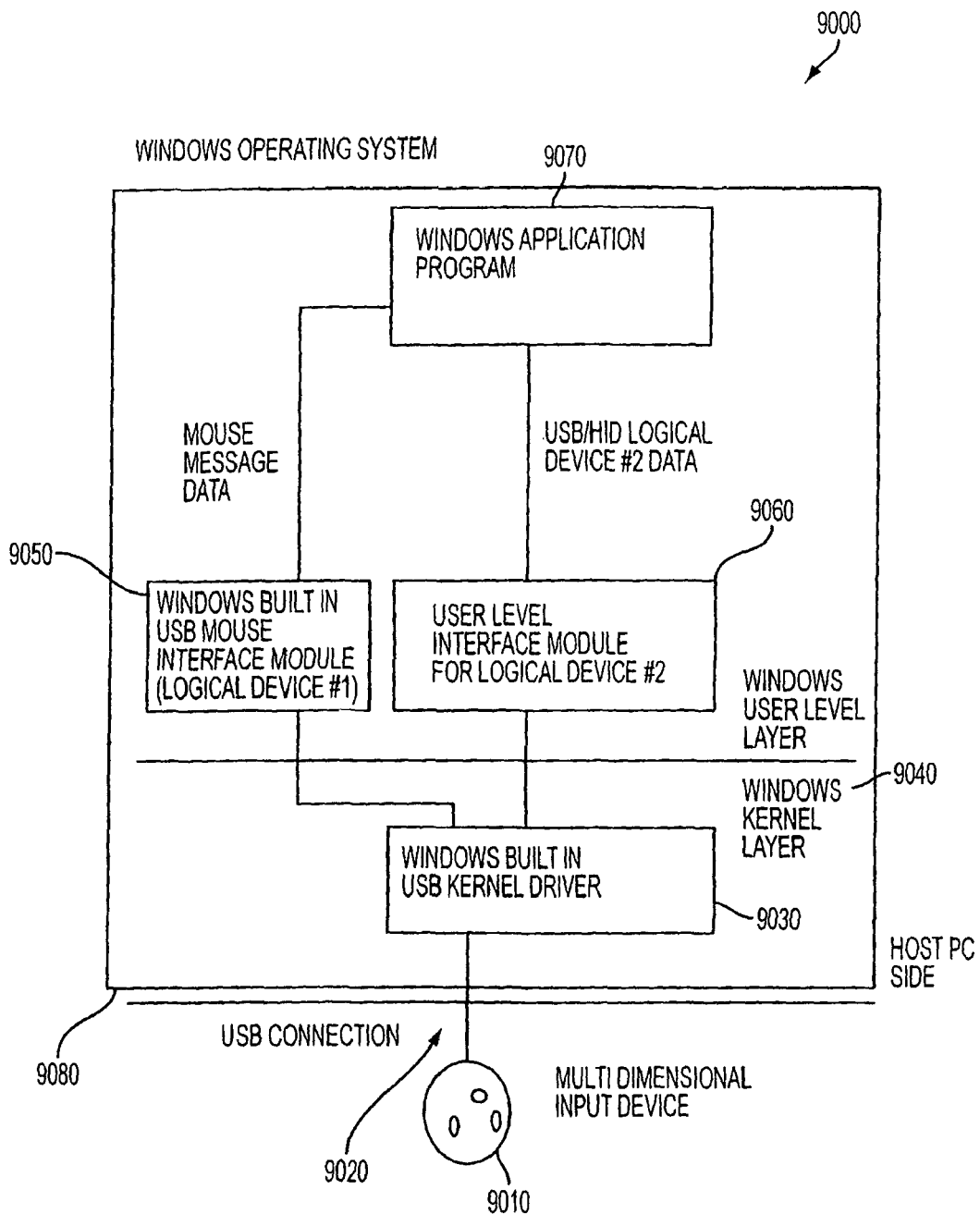

FIG. 33 illustrates a multidimensional device 9010 coupled to a computer 9000. The multidimensional device 9010 sends data to a Windows built in USB kernel driver 9030 via a USB connection 9020. The Windows built in USB kernel driver 9030 is in a Window kernel layer 9040 and sends data to a Windows built in USB mouse interface module 9050 and a user level interface module for logical device #2 9060. Both modules send respective data to a Windows application program 9070. Thus, when an input device is connected to a host PC through a USB port, Microsoft built-in USB drivers will detect two independent USB devices (USB mouse and another USB input device) as if two USB input devices are physically connected to the host PC.

Usage of this interface software concept based on multiple logical devices is free from possible incompatibility with current definitions of mouse data packet and/or future revision of mouse data packet as defined by Microsoft.

The specification for data packet of a Microsoft mouse or a Microsoft equivalent 2D mouse is defined below:

TABLE I

| Byte 1 | Mouse button data |
| Byte 2 | Mouse X position data |
| Byte 3 | Mouse Y position data |
| Byte 4 | Wheel data |

The above-listed specification can be revised by an addition of 3D manipulation data as shown below:

TABLE II

| Byte 1 | Mouse button data |
| Byte 2 | Mouse X position |
| Byte 3 | Mouse Y position |
| Byte 4 | Wheel data |
| Byte 5 | 3D function data 1 |
| Byte 6 | 3D function data 2 |
| Byte 7 | 3D function data 3 |

The interface method using multiple logical device structure can easily add any new input control functions by defining a new logical device in the firmware as necessary to expand capability without rewriting the entire firmware. The following is an example implementation of this interface method:

Logical Device #1 Data Packet:
(100% as same as MS mouse data specification)

TABLE III

| Byte 1 | Mouse button data |
| Byte 2 | Mouse X position data |
| Byte 3 | Mouse Y position data |
| Byte 4 | Wheel data |

Logical Device #2 Data Packet:

TABLE IV

| Byte 1 | 3D function data 1 |
| Byte 2 | 3D function data 2 |
| Byte 3 | 3D function data 3 |
| Byte 4 | 3D function data |

2D/3D Graphic Application Program in Windows XP Operating System

Figure 34:
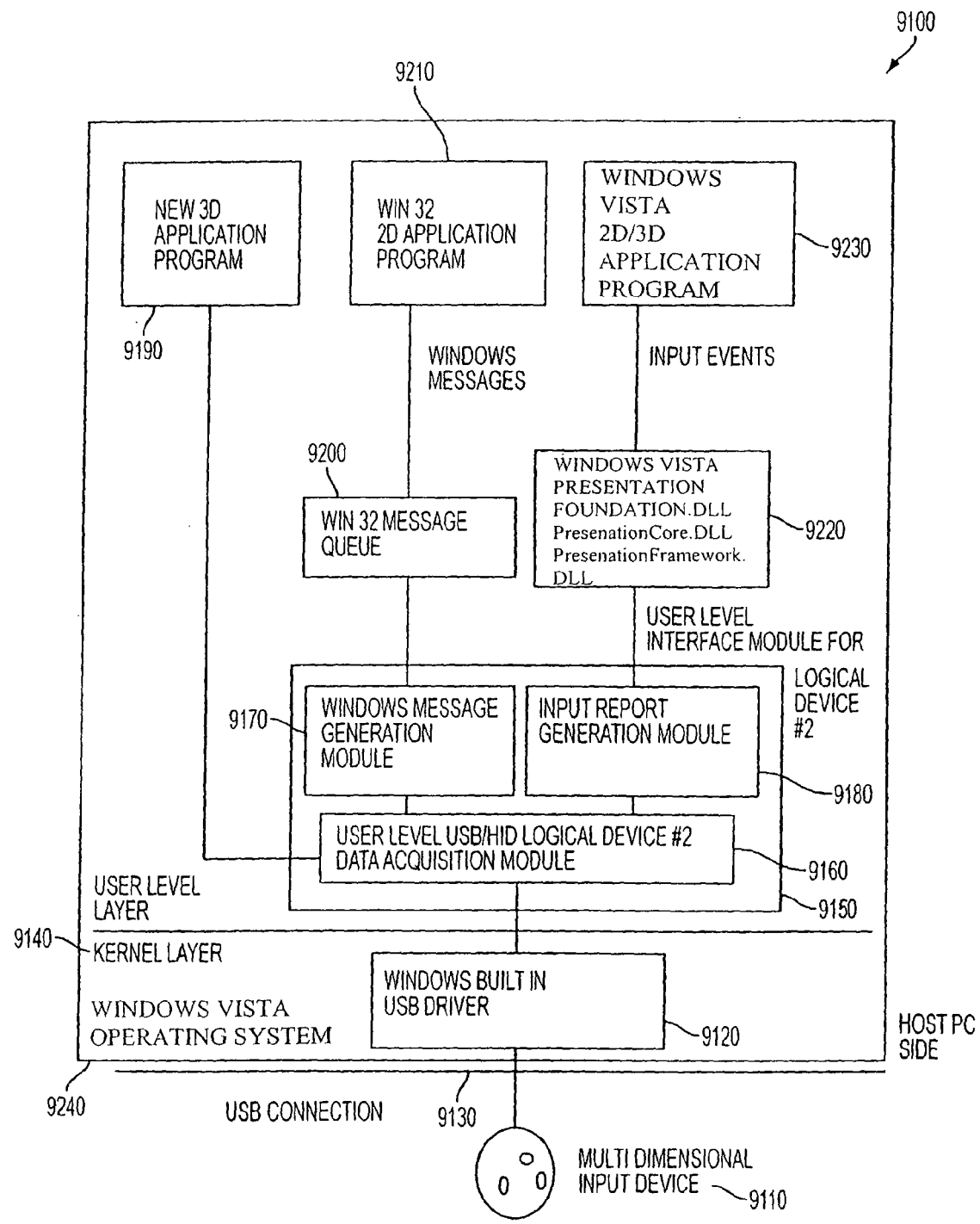
FIG. 34 illustrates an interface software method that provides utilization of multiple degrees of freedom input commands, in accordance with an exemplary embodiment.

FIG. 34 illustrates an interface software method 9100 that provides utilization of multiple degrees of freedom input commands to both conventional 2D application programs such as MS WORD and 2D/3D application program which will run on future operating systems, such as the Windows Vista operating system, that support 3D application programs, in accordance with an exemplary embodiment. Generation of 3D application specific commands, for a new 3D graphic application program, can utilize the current RAWINPUT API of Windows XP or the future RAWINPUT API equivalent package in the Windows Vista operating system.

The interface software method includes a multidimensional input device 9110 coupled to a computer 9240. The multidimensional device 9110 sends data to a Windows built in USB driver 9120 via a USB connection 9130. The Windows built in USB driver 9120 is located in a Windows kernel layer 9140. The Windows built in USB driver 9120 delivers data to a user level interface module for logical device #2 9150. The user level interface module contains a user level USB/HID logical device #2 data acquisition module 9160, a windows message generation module 9170, and an input report generation module 9180. The user level USB/HID logical device #2 data acquisition module delivers data to new 3D application programs as well as the windows message generation module 9170 and the input report generation module. The windows message generation module 9170 delivers data to a Win 32 message queue 9200 which delivers data to a Win 32 2D application program. The input report generation module 9180 delivers data to a Windows Vista Graphics Presentation Foundation DLL 9220 which delivers data to a Windows Vista 2D/3D application program 9230.

In operation, manipulation of some conventional 2D Windows functions such as scrolling of an application window is achieved by sending corresponding messages to the Windows message management module (USER32.dll in Win XP or PresentationCore.dll and/or PresentationFramwork.dll in Windows Vista). Manipulation of 3D GUI based Windows functions such as rotation of 2D application window in 3D GUI in the Windows Vista OS is accomplished by sending corresponding messages to PresentationCore.dll and/or PresentationFramwork.dll.

The data acquisition module 9160 will use RAWINPUT API functions, provided by Microsoft, to retrieve raw input data of the logical device #2 on Windows XP. A RAWINPUT API equivalent function package for Windows Vista is also provided by Microsoft. The detailed programming information of RAWINPUT API is provided by the Microsoft platform software development kit ("SDK") document. In summary, the data acquisition module registers the logical device #2 to receive raw input data. When the logical device #2 sends a data packet, the data acquisition module will receive WM_INPUT message from a message queue of Windows. Then, the data acquisition module will use the GetRawInputData function to receive raw input data. A 3D application program 9190 will get the raw input data by calling a programmer defined function to request the transfer of raw data from the data acquisition module 9160.

Windows message generation module 9170 in FIG. 34, will send 2D software-related messages to Win32 message queue 9200 (part of USER32.dll) to generate 2D command using raw data of logical device #2. For example, if a user wants to use the top sensor 130 in FIG. 1 for horizontal scrolling of a 2D application program such as spreadsheet, software can be used to convert raw input data of sensor 130 to an activation signal for horizontal scrolling by using Win32 function SendMassage(hwnd, WM_HSCROLL, wParam, lParam), where hwnd is the handle of input focused application, spreadsheet program in this environment. The function SendMassage(hwnd, WM_HSCROLL, wParam, lParam) actually places WM_HSCROOL message in the Win32 message queue 9200, and then that message is sent to the input focused application, or spreadsheet program. The 2D spreadsheet program retrieves WM_HSCROOL message and the application's horizontal scroll cursor will be moved to horizontal direction.

Input report module 9180 in FIG. 34 will send to the Windows Vista a defined input report message (equivalent Win32 messages) to PresentationCore.dll and/or PresentationFramwork.dll in the Windows Vista to generate 3D commands such as zoom in, zoom out, yaw or roll of specific application window in 3D GUI environment.

Figure 35:
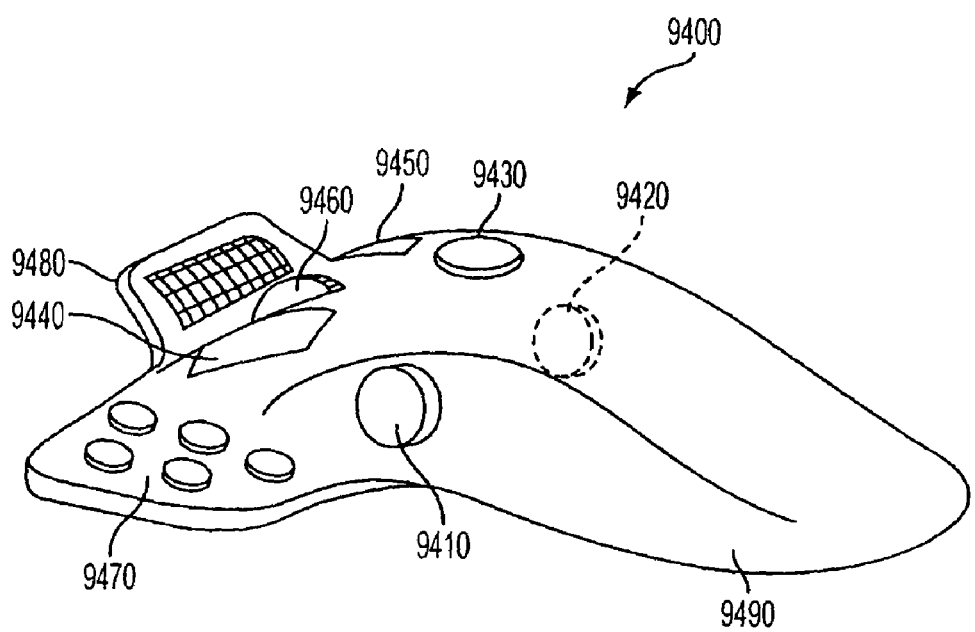
FIG. 35 illustrates a nine degrees of freedom mouse with programmable buttons and a small LCD screen, in accordance with an exemplary embodiment.

FIG. 35 illustrates a nine degrees of freedom device 9400 with programmable buttons and a small LCD screen, in accordance with an exemplary embodiment. In the embodiment illustrated, a left sensor 9410, a right sensor 9420, and a top sensor 9430, a left mouse button 9440, a right mouse button 9450, a wheel 9460, a plurality of user programmable buttons 9470, and a LCD screen 9480 are coupled to a chassis 9490. The chassis 9490 is in the form of a mouse body. In this embodiment, the user programmable buttons 9470 and the small LCD screen 9480 are added as additional input devices as compared to the embodiment portrayed in FIG. 1.

Figure 36:
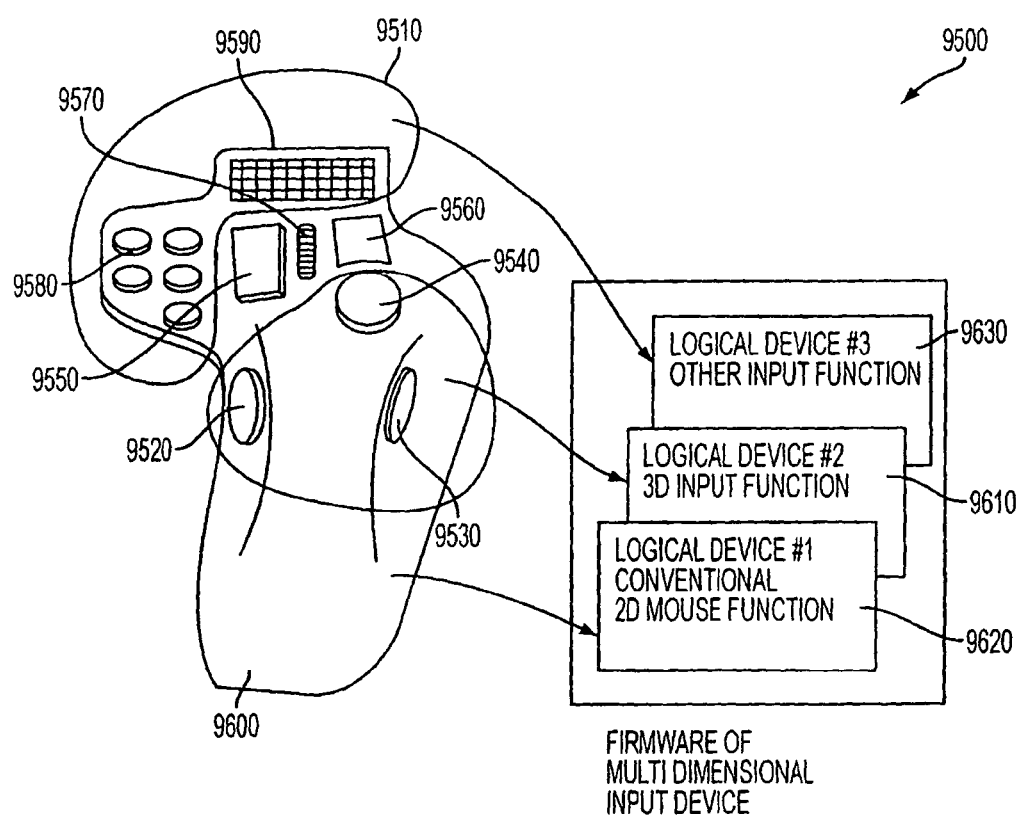
FIGS. 36-37 illustrate an interface method to an input device that embodies several distinct modules, in accordance with an exemplary embodiment.
Figure 37:
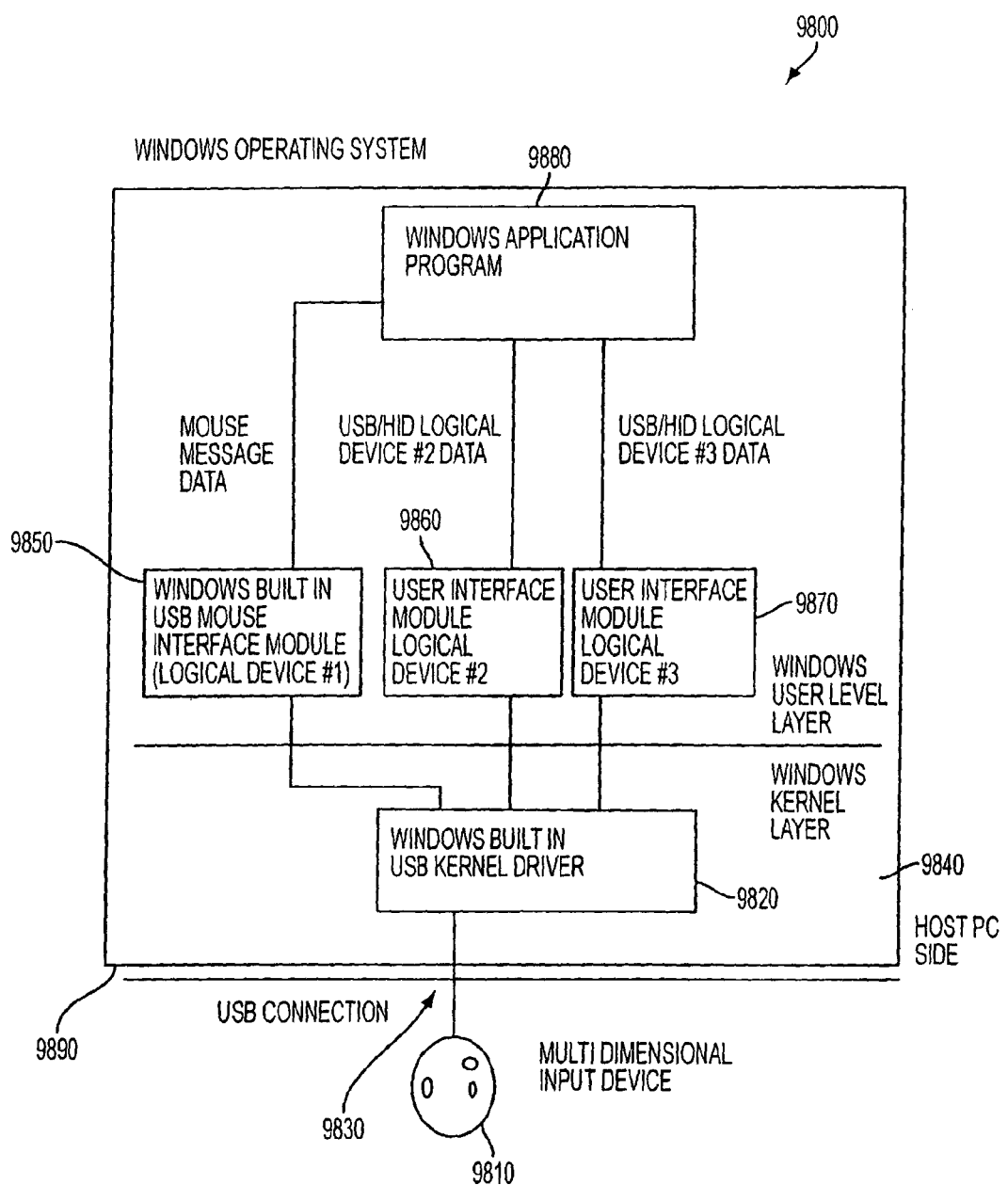

FIGS. 36-37 illustrate an interface method 9500 to an input device that embodies several distinct modules, in accordance with an exemplary embodiment. In the embodiment illustrated in FIG. 36, a multidimensional input device 9510 includes a bottom sensor (not shown), a left sensor 9520, a right sensor 9530, a top sensor 9540, a left mouse button 9550, a right mouse button 9560, a wheel 9570, a plurality of programmable buttons 9580, and an LCD screen 9590 coupled to a chassis 9600. The chassis 9560 is in the form of a mouse body. The three sensors 9520, 9530, 9540 can generate input control signals representing motion in six degrees of freedom. The input control signals generated by the three sensors 9520, 9530, 9540 can be represented by logical device #2 9610 for 3D input functions. The bottom sensor (not shown) and the wheel 9570 can generate input control signals representing three degrees of freedom. The input control signals generated by the bottom sensor (not shown) and the wheel 9570, along with the left and right mouse buttons 9550, 9560, can be represented by logical device #1 9620 for 2D mouse functions. The plurality of buttons and the LCD screen can be represented by logical device #3 9630 for other input functions. As shown, software can be developed to define the third logical device so that the implementation of function of user programmable buttons 9580 and small LCD screen 9590 can be achieved. The functional addition does not require any modification of logical device #1 9620 or logical device #2 9610, but just the addition of a software program for the handling of data for user programmable buttons 9580 and small LCD screen 9590.

FIG. 37 illustrates a multidimensional device coupled to a computer 9800 having three logical devices. In the embodiment illustrated in FIG. 37, a multidimensional input device 9810 is coupled to a computer 9890. The multidimensional input device sends data to a Windows built in USB kernel driver 9820 via a USB connection 9830. The Windows built in USB kernel driver is in a Windows kernel layer 9840 and sends data to a Windows built in USB mouse interface module 9850, a user interface module for logical device #2 9860, and a user interface module for logical device #3 9870. The windows built in USB mouse interface module 9850, the user interface module for logical device #2 9860, and the user interface module for logical device #3 9870 sends data to a Windows application program 9880. As shown, the computer 9890 detects three independent logical devices from the multidimensional input device 9810.

As discussed above, a multidimensional device, method and interface for facilitating manipulation in six degrees of freedom is disclosed. While a number of exemplary aspects and embodiments have been discussed above, those of skill in the art will recognize certain modifications, permutations, additions and sub-combinations thereof. It is therefore intended that claims hereafter introduced are interpreted to include all such modifications, permutations, additions and sub-combinations as are within their true spirit and scope.

The invention claimed is:

1. A multidimensional input device comprising:
a chassis suitable for user to grasp with one hand,
a first sensor, located on a first outside surface of the chassis, suitable for finger operation, said first sensor capable of generating a first input control signal and a second input control signal, said first input control signal and said second input control signal representing motion in both a first degree of freedom, represented by movement along an X-axis, and a second degree of freedom, represented by angular movement around said X-axis,
a second sensor, located on a second outside surface of the chassis, suitable for finger operation, said second sensor capable of generating a third input control signal and a fourth input control signal, said third input control signal and said fourth input control signal representing motion in both a third degree, represented by movement along a Y-axis, of freedom and a fourth degree of freedom, represented by movement along a Z-axis, and
a third sensor, located on a third outside surface of the chassis, suitable for finger operation, said third sensor capable of generating a fifth input control signal and a sixth input control signal, said fifth input control signal and said sixth input control signal representing motion in both a fifth degree of freedom, represented by angular movement around said Y-axis, and a sixth degree of freedom, represented by angular movement around said Z-axis;

wherein said first, second, and third sensors are coupled to said chassis and positioned to allow said user to generate six input control signals representing motion in six degrees of freedom with one hand.

2. A multidimensional input device as recited in claim 1, said chassis further comprising:
a bottom surface suitable for sliding on a flat surface,
a sensor located on said bottom surface capable of generating a seventh input control signal and an eighth input control signal, said seventh input control signal and said eighth input control signal representing motion in both a seventh degree of freedom and an eighth degree of freedom.

3. A multidimensional input device as recited in claim 2, said chassis further comprising:
a top surface,
a wheel pivotally coupled to said top surface suitable for finger operation, said wheel capable of generating a ninth input control signal, said ninth input control signal representing motion in a ninth degree of freedom.

4. A multidimensional input device as recited in claim 3, wherein said first, second, third, fourth, fifth, and sixth degrees of freedom facilitate fast three dimensional manipulation and said seventh, eight, and ninth degrees of freedom facilitate two dimensional operation or precise three dimensional manipulation.

5. A multidimensional input device as recited in claim 3, wherein said chassis is a mouse body.

6. A multidimensional input device as recited in claim 3, further comprising a first and a second mouse button.

7. A multidimensional input device as recited in claim 1, wherein said sensors follow an intuitive 3D command mapping rule.

8. A multidimensional input device as recited in claim 2, wherein said seventh degree of freedom and said eighth degree of freedom is represented by movement in a two dimensional X-Y plane.

9. A multidimensional input device as recited in claim 3, wherein said ninth degree of freedom is represented by movement along a Z-axis.

10. A multidimensional input device as recited in claim 3, wherein said chassis facilitates three dimensional computer aided design.

11. A multidimensional input device as recited in claim 1, wherein said six degrees of freedom are represented by a configuration created by said user.

12. A multidimensional input device as recited in claim 1, wherein said first sensor and said second sensor are located on opposite sides of said chassis, and said third sensor is located on top of said chassis.

13. A multidimensional input device as recited in claim 1, wherein said first sensor, said second sensor, and said third sensor are located on top of said chassis.

14. A multidimensional input device as recited in claim 1, wherein said first sensor and said second sensor are elevated.

15. A multidimensional input device as recited in claim 14, wherein said third sensor is elevated.

16. A multidimensional input device as recited in claim 15, wherein said first, said second, and said third sensor are in a T structure.

17. A multidimensional input device as recited in claim 1, wherein said first sensor and said second sensor are located on the same side of said chassis, and said third sensor is located on top of said chassis.

18. A multidimensional input device as recited in claim 1, wherein said first sensor is surrounded by said second sensor.

19. A multidimensional input device as recited in claim 1, wherein said sensors are analog sensors.

20. A multidimensional input device as recited in claim 1, wherein said sensors are digital sensors.

21. A multidimensional input device as recited in claim 1, wherein said sensors are touchpad sensors.

22. A multidimensional input device as recited in claim 21, wherein said touchpad sensors generate velocity command signals for three dimensional applications.

23. A multidimensional input device as recited in claim 1, wherein said sensors are tilt wheel component sensors.

24. A multidimensional input device as recited in claim 23, wherein said tilt wheel component sensors generate velocity command signals for three dimensional applications.

25. A multidimensional input device as recited in claim 1, wherein two of said sensors form a combination analog and digital sensor.

26. A multidimensional input device as recited in claim 1, wherein two of said sensors form a combination digital and touchpad sensor.

27. A multidimensional input device as recited in claim 1, wherein two of said sensors form a combination analog and touchpad sensor.

28. A multidimensional input device as recited in claim 1, wherein two of said sensors form a combination touchpad sensor.

29. A multidimensional input device as recited in claim 1, wherein two of said sensors form a combination analog sensor.

30. A multidimensional input device as recited in claim 1, wherein two of said sensors form a combination digital sensor.

31. A multidimensional input device as recited in claim 1, wherein said chassis is integrated into a keyboard.

32. A multidimensional input device as recited in claim 1, wherein said chassis is integrated into a laptop computer.

33. A multidimensional input device as recited in claim 1, wherein said chassis is a mouse body.

34. A multidimensional input device as recited in claim 1, wherein said chassis is integrated into a joystick.

35. A multidimensional input device as recited in claim 1, further comprising a USB connector for providing said input control signals to a computer, said USB connector being detachably coupled to a USB port on said computer.

36. A multidimensional input device as recited in claim 1, wherein said chassis further comprises user programmable buttons.

37. A multidimensional input device as recited in claim 1, wherein said chassis further comprises an LCD screen.

38. An interfacing system comprising:
a multidimensional device having a plurality of sensors, said plurality of sensors including a first group of sensors capable of generating a first group of input control signals and a second group of sensors capable of generating a second group of input control signals, and
a firmware program embedded into said multidimensional device, said firmware program capable of generating an output simulating a first logical device and a second logical device, said first logical device representing said first group of input control signals, said second logical device representing said second group input control signals;
wherein a computer receiving said output from said multidimensional device operates as though two independent logical devices exist.

39. An interfacing system as recited in claim 38, wherein said first logical device manipulates two dimensional applications.

40. An interfacing system as recited in claim 38, wherein said second logical device manipulates three dimensional applications.

41. An interfacing system as recited in claim 38, said firmware program further comprising:
   a two dimensional input control signal slave module, and
   a three dimensional input control signal slave module.

42. An interfacing system as recited in claim 38, further comprising
   a third group of sensors included in said plurality of sensors capable of generating a third group of input control signals,
   a third logical device represented by said output, said third logical device representing said third group of input control signals,
   wherein said computer detects three independent logical devices.

43. An interfacing system as recited in claim 38, further comprising:
   a USB connector having a first end and a second end, said first end coupled to said multidimensional device, said second end detachably coupled to a USB port on said computer.

44. An interfacing system as recited in claim 38, further comprising:
   a User Level Interface Software Module on said computer that allow said user to use said second logical device for manipulation of 3D application programs in Windows XP and Windows Vista OS.

45. A method for multidimensional control comprising:
   providing a first sensor suitable for finger operation, said first sensor capable of generating a first input control signal and a second input control signal, said first input control signal and said second input control signal representing motion in both a first degree of freedom, represented by movement along an X-axis, and a second degree of freedom, represented by angular movement around said X-axis,
   providing a second sensor suitable for finger operation, said second sensor capable of generating a third input control signal and a fourth input control signal, said third input control signal and said fourth input control signal representing motion in both a third degree of freedom, represented by movement along a Y-axis, and a fourth degree of freedom, represented by movement along a Z-axis,
   providing a third sensor suitable for finger operation, said third sensor capable of generating a fifth input control signal and a sixth input control signal, said fifth input control signal and said sixth input control signal representing motion in both a fifth degree of freedom, represented by angular movement around said Y-axis, and a sixth degree of freedom, represented by angular movement around said Z-axis, and
   providing a chassis suitable for a user to grasp with one hand;
coupling said first, second and third sensor to said chassis in a position that allows said user to generate six input control signals representing motion in six degrees of freedom with one hand.

* * * * *